(12) United States Patent
Okajima

(10) Patent No.: US 12,459,524 B2
(45) Date of Patent: Nov. 4, 2025

(54) DRIVING ASSISTANCE INFORMATION DELIVERY APPARATUS, TRAFFIC SYSTEM, TRAFFIC CONTROL SYSTEM, VEHICLE, VEHICLE CONTROL DEVICE, AND STORAGE MEDIUM

(71) Applicant: Mitsubishi Electric Corporation, Tokyo (JP)

(72) Inventor: Kuniaki Okajima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 102 days.

(21) Appl. No.: 18/267,167

(22) PCT Filed: Jan. 20, 2022

(86) PCT No.: PCT/JP2022/002007
§ 371 (c)(1),
(2) Date: Jun. 14, 2023

(87) PCT Pub. No.: WO2022/163496
PCT Pub. Date: Aug. 4, 2022

(65) Prior Publication Data
US 2024/0043029 A1 Feb. 8, 2024

(30) Foreign Application Priority Data
Jan. 29, 2021 (JP) .................. 2021-013743

(51) Int. Cl.
*B60W 50/14* (2020.01)
*B60W 40/02* (2006.01)
(Continued)

(52) U.S. Cl.
CPC ............ *B60W 50/14* (2013.01); *B60W 40/02* (2013.01); *B60W 60/0059* (2020.02);
(Continued)

(58) Field of Classification Search
CPC .. B60W 50/14; B60W 60/0059; B60W 40/02; B60W 2556/45; B60W 2050/146; G08G 1/0969
(Continued)

(56) References Cited

U.S. PATENT DOCUMENTS 5,911,773 A 6/1999 Mutsuga et al.
11,004,339 B2 * 5/2021 Oe .................. B60W 40/04
(Continued)

FOREIGN PATENT DOCUMENTS

JP 09-287966 A 11/1997
JP 2004-110185 A 4/2004
(Continued)

OTHER PUBLICATIONS

Notice of Reasons for Refusal issued on Jun. 22, 2021 in Japanese Patent Application No. 2021-013743.
(Continued)

*Primary Examiner* — Zhen Y Wu
(74) *Attorney, Agent, or Firm* — Sughrue Mion, PLLC

(57) ABSTRACT

A driving assistance information delivery apparatus according to the present disclosure includes an information acquisition unit that acquires information from a plurality of information provision apparatuses, a requirement item extraction unit that extracts information for determining whether or not restriction of automated driving or driving assistance functions is necessary from the information acquired by the information acquisition unit, and an information delivery unit that delivers the information extracted by the requirement item extraction unit as driving assistance information.

19 Claims, 15 Drawing Sheets

(51) Int. Cl.
  *B60W 60/00* (2020.01)
  *G08G 1/0969* (2006.01)
(52) U.S. Cl.
  CPC ..... *G08G 1/0969* (2013.01); *B60W 2050/146* (2013.01); *B60W 2556/45* (2020.02)
(58) Field of Classification Search
  USPC ...................................................... 340/425.5
  See application file for complete search history.

(56) References Cited

U.S. PATENT DOCUMENTS

| | | | |
|---|---|---|---|
| 11,409,281 B2* | 8/2022 | Yamaguchi | ............. H04W 4/46 |
| 2009/0076774 A1 | 3/2009 | Miyajima | |
| 2011/0160987 A1 | 6/2011 | Wu et al. | |
| 2013/0187771 A1* | 7/2013 | Rothschild | ......... G08G 1/09675 340/435 |
| 2015/0149035 A1* | 5/2015 | Enthaler | ................ B60K 35/10 701/36 |
| 2015/0262482 A1* | 9/2015 | Kosatka-Pioro | ............................ G08G 1/096716 340/932 |
| 2016/0280224 A1* | 9/2016 | Tatourian | ............ B60W 40/076 |
| 2017/0076599 A1* | 3/2017 | Gupta | ................ G08G 1/09623 |
| 2017/0203770 A1 | 7/2017 | Kondo | |
| 2018/0004205 A1* | 1/2018 | Matsunaga | .......... G05D 1/0061 |
| 2018/0056991 A1 | 3/2018 | Sogen | |
| 2018/0088572 A1* | 3/2018 | Uchida | ................ B60W 30/16 |
| 2018/0345962 A1 | 12/2018 | Konishi | |
| 2018/0365998 A1 | 12/2018 | Shibata et al. | |
| 2019/0294163 A1* | 9/2019 | Ueno | .................... B60W 30/18 |
| 2019/0322291 A1 | 10/2019 | Tsuda | |
| 2020/0164888 A1* | 5/2020 | Hiramatsu | ........... G05D 1/0088 |
| 2021/0155269 A1* | 5/2021 | Oba | ................. G08G 1/096775 |
| 2022/0009524 A1* | 1/2022 | Oba | ................. B60W 60/0057 |

FOREIGN PATENT DOCUMENTS

| | | |
|---|---|---|
| JP | 2008-117231 A | 5/2008 |
| JP | 2009-075647 A | 4/2009 |
| JP | 2011-138486 A | 7/2011 |
| JP | 2013-024709 A | 2/2013 |
| JP | 2016-028927 A | 3/2016 |
| JP | 2017-224107 A | 12/2017 |
| JP | 2018-032336 A | 3/2018 |
| JP | 2018-206024 A | 12/2018 |
| JP | 2020-027321 A | 2/2020 |
| WO | 2017/017783 A1 | 2/2017 |
| WO | 2018/074586 A1 | 4/2018 |
| WO | 2019/208015 A1 | 10/2019 |

OTHER PUBLICATIONS

International Search Report for PCT/JP2022/002007 dated Mar. 22, 2022 (PCT/ISA/210).

Japanese Office Action dated Jan. 7, 2025 in Application No. 2023-076303.

* cited by examiner

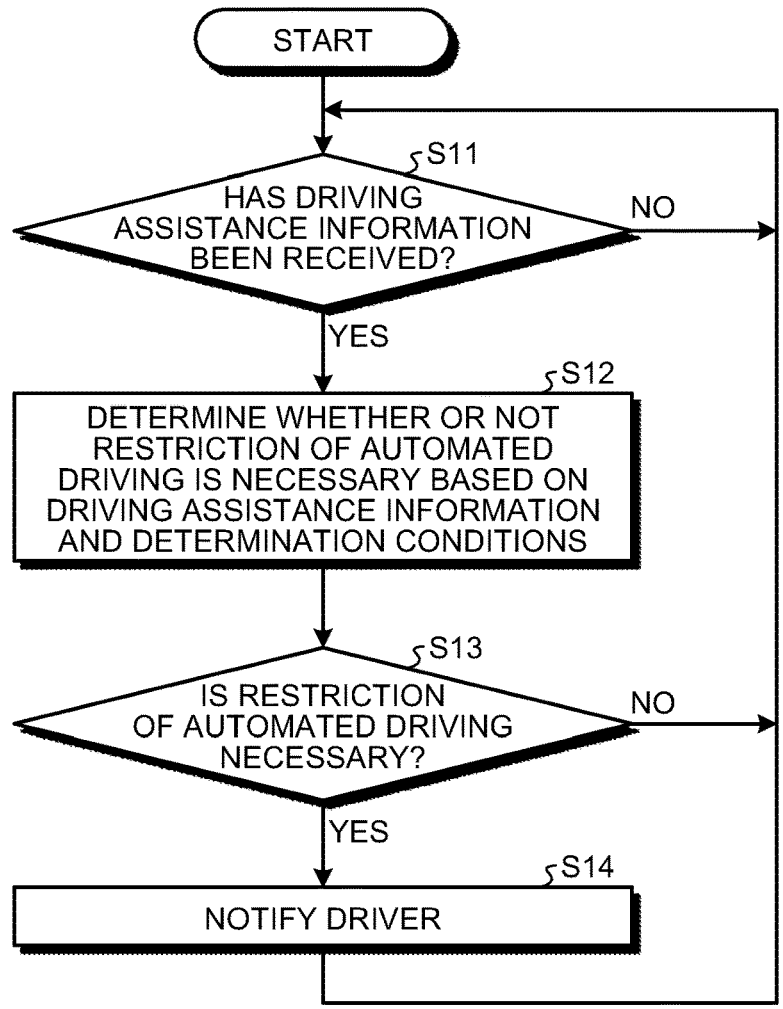

FIG.7

| DEFI-NITION | USED INFORMATION | DETERMINATION CONDITION | REGULATION |
|---|---|---|---|
| #1 | ・COMMUNICATION ENVIRONMENT (INFRASTRUCTURE COORDINATION CONDITION) | ・FAULTY COMMUNICATION OR PARTLY FAULTY COMMUNICATION | PROHIBITION OF AUTOMATED DRIVING REQUIRING INFRASTRUCTURE COORDINATION |
| #2 | ・GEOGRAPHICAL ATTRIBUTE (GEOGRAPHICAL CONDITION)<br>・PRESENCE OR ABSENCE OF SIDEWALK (ROAD CONDITION) | ・SCHOOL ZONE AND ABSENCE OF SIDEWALK | PROHIBITION OF AUTOMATED DRIVING |
| #3 | ・AMOUNT OF SNOW (ENVIRONMENTAL CONDITION)<br>・PRESENCE OR ABSENCE OF CHAIN REGULATION (TRAFFIC CONDITION) | ・SNOW HIGHER THAN OR EQUAL TO H cm AND PRESENCE OF CHAIN REGULATION | PROHIBITION OF AUTOMATED DRIVING IF VEHICLE IS NOT EQUIPPED WITH CHAINS OR SNOW TIRES<br><br>PERMISSION OF ONLY AUTOMATED TRAVEL AT XX km/h OR LOWER IF VEHICLE IS NOT EQUIPPED WITH CHAINS OR SNOW TIRES |
| #4 | ・NUMBER OF LANES (ROAD CONDITION)<br>・TRAFFIC VOLUME (TRAFFIC CONDITION) | ・M VEHICLES/km OR MORE PER LANE | PERMISSION OF ONLY AUTOMATED TRAVEL BY TRACKING PRECEDING VEHICLE AT YY km/h OR LOWER |
| #5 | ・COMMUNICATION ENVIRONMENT (INFRASTRUCTURE COORDINATION CONDITION)<br>・PRESENCE OR ABSENCE OF LANE DEDICATED TO AUTOMATED DRIVING (ROAD CONDITION) | ・FAULTY COMMUNICATION OR PARTLY FAULTY COMMUNICATION, AND LANE DEDICATED TO AUTOMATED DRIVING | PERMISSION OF DRIVING ONLY IN LANE DEDICATED TO AUTOMATED DRIVING |
| ... | ... | ... | ... |

FIG.8

| AREA | GEOGRAPHICAL ATTRIBUTE | TRAFFIC-RELATED INFORMATION |
|---|---|---|
| A | SCHOOL ZONE | PROHIBITION OF PASSAGE OF LARGE VEHICLE |
| B | RESIDENTIAL AREA | |
| C | MOUNTAINOUS AREA | |
| ... | ... | ... |

FIG.9

| AREA | COMMUNICATION ENVIRONMENT |
|---|---|
| A | GOOD |
| B | GOOD |
| C | PARTLY FAULTY |
| ... | ... |

| AREA | ROAD WIDTH | SIDEWALK | SIDE STRIP | LANE DEDICATED TO AUTOMATED DRIVING |
|---|---|---|---|---|
| A | W1 | ABSENT | ABSENT | ABSENT |
| B | W2 | PRESENT | ABSENT | PRESENT |
| C | W3 | ABSENT | ABSENT | ABSENT |
| ... | ... | ... | ... | ... |

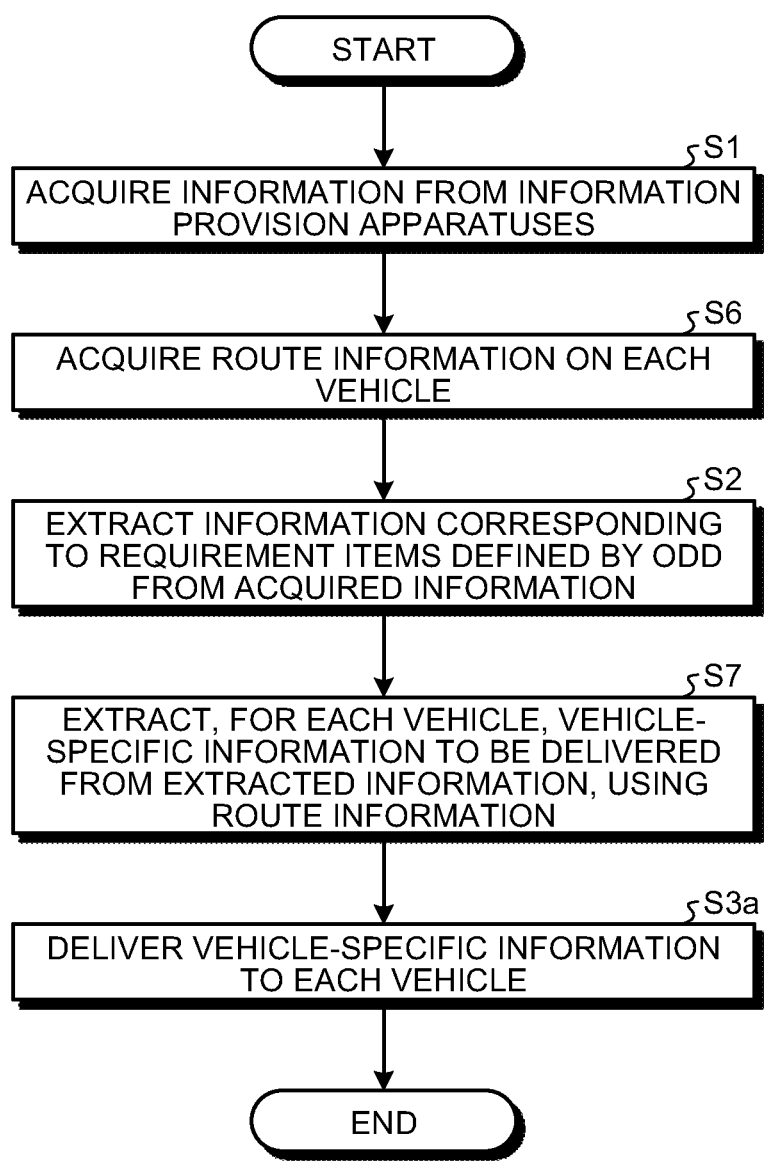

DRIVING ASSISTANCE INFORMATION DELIVERY APPARATUS, TRAFFIC SYSTEM, TRAFFIC CONTROL SYSTEM, VEHICLE, VEHICLE CONTROL DEVICE, AND STORAGE MEDIUM

CROSS REFERENCE TO RELATED APPLICATIONS

This application is a National Stage of International Application No. PCT/JP2022/002007 filed Jan. 20, 2022, claiming priority based on Japanese Patent Application No. 2021-013743 filed Jan. 29, 2021.

FIELD

The present disclosure relates to a driving assistance information delivery apparatus for delivering information to vehicles automated in at least some driving operations, a traffic system, a traffic control system, a vehicle, a vehicle control device, and a computer program.

BACKGROUND

For the practical application of automated driving of automobiles (hereinafter, referred to as vehicles), studies, developments, etc. have been conducted in recent years. Regarding automated driving, the degree of automation is commonly indicated using levels defined by the Society of Automotive Engineers of the United States. The levels defined by the Society of Automotive Engineers of the United States are defined in six levels from Level 0 representing manual driving to Level 5 representing fully automated driving. In general, Level 3 and higher are called automated driving, and levels 1 and 2 are called driving assistance.

Patent Literature 1 discloses an automated driving technique using dynamic map data. In the technique described in Patent Literature 1, an automated driving assistance apparatus mounted on a vehicle stores conditions for use of the dynamic map data in advance, and determines whether or not to permit automated driving according to whether or not the use conditions are met.

CITATION LIST

Patent Literature

Patent Literature 1: WO 2018/074586 A

SUMMARY OF INVENTION

Problem to be Solved by the Invention

In automation of driving including automated driving and driving assistance, in order to achieve safe vehicle operations, the performance of automated driving or driving assistance may be restricted under environments where conditions such as road environment and the weather are not suitable for driving automation. For example, Guideline regarding Safety Technology for Automated Vehicles of the Ministry of Land, Infrastructure, Transport and Tourism defines driving environment conditions including road conditions, geographical conditions, environmental conditions, and other conditions as the operational design domain (ODD), and requires automated driving to be performed within the ODD. In the future, restrictions according to the driving environment conditions may be likewise defined for Levels 1 and 2 driving assistance described above, in addition to Level 3 and higher automated driving.

In the technique described in Patent Literature 1, only the determination of whether or not to permit automated driving is performed based on the use conditions related to a contract for using the dynamic map data, such as identification information of a subscriber of the dynamic map data, a password, and version information, and the determination of whether or not the restriction of automated driving or driving assistance functions is necessary based on the driving environment conditions as described above is not performed. Patent Literature 1 discloses the delivery of the dynamic map data including information on obstacles etc. to vehicles, but this information is not information for determining whether or not the restriction of automated driving or driving assistance functions is necessary.

The present disclosure has been made in view of the above, and an object of the present disclosure is to contribute to the realization of safer automated driving and driving assistance, using information for determining whether or not the restriction of automated driving or driving assistance functions is necessary.

Means to Solve the Problem

To solve the problem and achieve the object described above, a driving assistance information delivery apparatus according to the present disclosure includes: an information acquisition unit to acquire information from a plurality of information provision apparatuses; a requirement item extraction unit to extract information for determining whether or not restriction of automated driving or driving assistance functions is necessary from the information acquired by the information acquisition unit; and an information delivery unit to deliver the information extracted by the requirement item extraction unit as information (hereinafter, referred to as driving assistance information) for determining whether or not restriction of automated driving or driving assistance functions is necessary.

To solve the problem and achieve the object described above, a traffic system according to the present disclosure includes: a plurality of information provision apparatuses; and a driving assistance information delivery apparatus. The driving assistance information delivery apparatus includes an information acquisition unit to acquire information from the plurality of information provision apparatuses, a requirement item extraction unit to extract information for determining whether or not restriction of automated driving or driving assistance functions is necessary from the information acquired by the information acquisition unit, and an information delivery unit to deliver the information extracted by the requirement item extraction unit as driving assistance information to a plurality of vehicles.

To solve the problem and achieve the object described above, a traffic control system according to the present disclosure includes: an acquisition unit to acquire information for determining whether or not restriction of automated driving or driving assistance functions is necessary; a determination unit to determine whether or not restriction of automated driving or driving assistance functions is necessary, using the information acquired by the acquisition unit; and a control information delivery unit to deliver a result of the determination by the determination unit as control information to a vehicle.

To solve the problem and achieve the object described above, a vehicle according to the present disclosure includes: a communication unit to receive, from a driving assistance information delivery apparatus, information extracted from information acquired from a plurality of information provision apparatuses for determining whether or not restriction of automated driving or driving assistance functions is necessary as driving assistance information; a determination condition storage unit to store determination conditions indicating conditions for determining whether or not restriction of automated driving or driving assistance functions is necessary; and a vehicle control unit to determine whether or not restriction of automated driving or driving assistance functions is necessary, using the driving assistance information received by the communication unit and the determination conditions stored in the determination condition storage unit.

To solve the problem and achieve the object described above, a vehicle control device according to the present disclosure receives, via a communication unit, driving assistance information extracted from information acquired from a plurality of information provision apparatuses for determining whether or not restriction of automated driving or driving assistance functions is necessary, and determines whether or not restriction of automated driving or driving assistance functions is necessary, using the received driving assistance information.

To solve the problem and achieve the object described above, a computer program according to the present disclosure causes a computer to perform: a step of acquiring information from a plurality of information provision apparatuses; a step of extracting, from the acquired information, information for determining whether or not restriction of automated driving or driving assistance functions is necessary; and a step of delivering the extracted information as driving assistance information.

Effects of the Invention

The present disclosure has the effect of being able to contribute to the realization of safer automated driving and driving assistance.

BRIEF DESCRIPTION OF DRAWINGS

FIG. 5 is a flowchart illustrating an example of a processing procedure at the time of receiving driving assistance information in the vehicle of the first embodiment.

FIG. 6 is a diagram illustrating an example of a screen displayed by a display unit of the first embodiment.

FIG. 7 is a diagram illustrating an example of requirements and regulations defined by an ODD in the first embodiment.

FIG. 8 is a diagram illustrating an example of information corresponding to geographical conditions in the driving assistance information of the first embodiment.

FIG. 9 is a diagram illustrating an example of information corresponding to infrastructure coordination conditions in the driving assistance information of the first embodiment.

FIG. 19 is a flowchart illustrating an example of a driving assistance information delivery processing procedure in the driving assistance information delivery apparatus of the fourth embodiment.

DESCRIPTION OF EMBODIMENTS

Hereinafter, a driving assistance information delivery apparatus, a traffic system, a traffic control system, a vehicle, a vehicle control device, and a computer program according to embodiments will be described in detail with reference to the drawings.

First Embodiment

Figure 1:
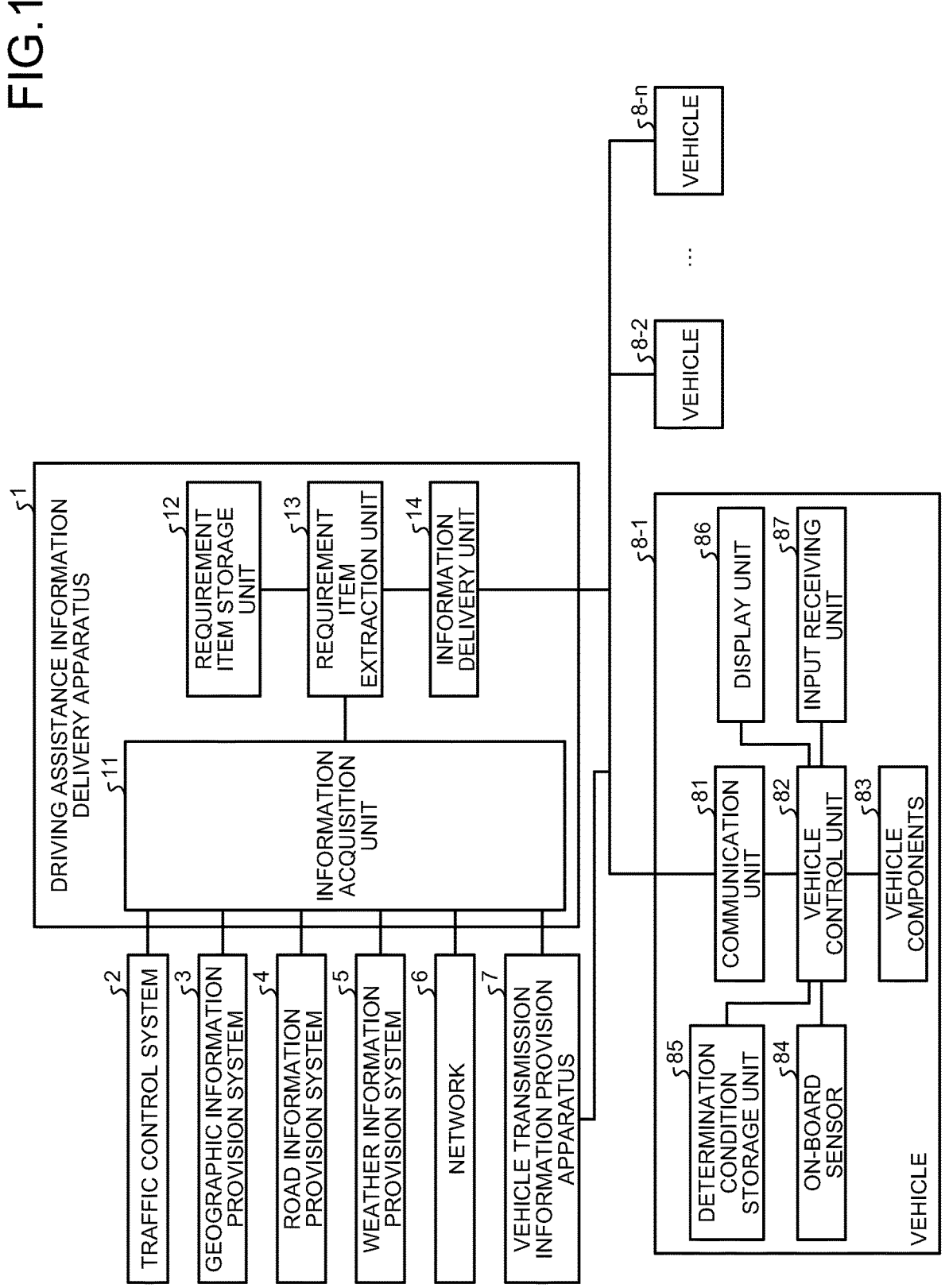
FIG. 1 is a diagram illustrating a configuration example of a traffic system including a driving assistance information delivery apparatus according to a first embodiment.

FIG. 1 is a diagram illustrating a configuration example of a traffic system including a driving assistance information delivery apparatus according to a first embodiment. The traffic system of the present embodiment includes a driving assistance information delivery apparatus 1 and vehicles 8-1 to 8-$n$. $n$ is an integer greater than or equal to two. The driving assistance information delivery apparatus 1 of the present embodiment acquires various types of information from a traffic control system 2, a geographic information provision system 3, a road information provision system 4, a weather information provision system 5, a network 6, and a vehicle transmission information provision apparatus 7, individually, extracts, from the acquired information, information for determining whether or not the restriction of automated driving or driving assistance functions is necessary, and delivers the extracted information as driving assistance information to the vehicles 8-1 to 8-$n$. Whether or not the restriction of automated driving or driving assistance functions is necessary is, for example, whether or not automated driving or driving assistance functions can be safely operated, or may alternatively be whether or not speed restriction is necessary, for example.

The vehicles 8-1 to 8-$n$ are vehicles capable of automated driving or vehicles having driving assistance functions. That is, the vehicles 8-1 to 8-$n$ are automated in at least some driving operations. The vehicles 8-1 to 8-$n$ are automobiles traveling on an expressway, in an integrated resort (IR) facility, or in a large commercial facility, for example, but are not limited thereto. The vehicles 8-1 to 8-$n$ may be automobiles traveling on an ordinary road or may be work vehicles such as towing cars traveling in an airport. The driving assistance information for determining whether or not the restriction of automated driving or driving assistance functions is necessary is, for example, information indicating driving environment conditions defined as an ODD. The following first describes an example in which the vehicles 8-1 to 8-$n$ are automated driving vehicles, and the driving assistance information is information indicating driving environment conditions defined as an ODD. However, as described above, the vehicles 8-1 to 8-$n$ may be vehicles having driving assistance functions. In this case, the driving assistance information is information used to determine whether or not the restriction of driving assistance functions is necessary. At least some of the vehicles 8-1 to 8-$n$ may be vehicles called connected cars or the like that can be connected to a communication network such as the Internet. Hereinafter, each of the vehicles 8-1 to 8-$n$ is referred to as a vehicle 8 when described without individual distinction.

For example, the driving assistance information delivery apparatus 1 may deliver the driving assistance information to the vehicles 8-1 to 8-$n$ via an antenna provided on an expressway, may deliver the driving assistance information to the vehicles 8-1 to 8-$n$ via a communication apparatus provided beside a road, such as a roadside apparatus, may deliver the driving assistance information to the vehicles 8-1 to 8-$n$ via an Internet line, a wireless local area network (LAN), or the like, may deliver the driving assistance information to the vehicles 8-1 to 8-$n$ via another communication line such as a mobile phone network, or may deliver the driving assistance information to the vehicles 8-1 to 8-$n$ via vehicle-to-vehicle communication from a vehicle that has received the delivery of the driving assistance information by any of these communication means to another vehicle. A delivery channel of the driving assistance information from the driving assistance information delivery apparatus 1 to the vehicles 8-1 to 8-$n$ is not limited to them, and may use any line.

The traffic control system 2 is a system that provides information about traffic such as road congestion information, traffic volume, road closure, and regulatory information including speed limits. The geographic information provision system 3 is a system that provides geographic information such as geographical attributes of individual areas and school zones. The road information provision system 4 is a system that provides road design information such as road shapes including width, gradient, and curvature, and the presence or absence of sidewalks. The weather information provision system 5 is a system that provides weather information such as the current weather, weather forecasts, weather warnings, and weather advisories. The network 6 is, for example, the Internet, and here, also includes devices such as various servers connected to the Internet. For example, the network 6 includes devices that provide social media and social networking services (SNSs). Here, if SNSs are considered to be an example of social media, the network 6 includes a system that delivers information posted on social media.

The vehicle transmission information provision apparatus 7 is a system that provides information that is collected from, of the vehicles 8-1 to 8-$n$, the vehicles 8 connectable to a network such as the Internet, and indicates driving conditions of the vehicles 8. The information indicating the driving conditions includes, for example, the results of measurement of vibrations detected by the vehicles 8 and the operating conditions of devices of the vehicles 8 such as wipers of the vehicles 8.

The traffic control system 2, the geographic information provision system 3, the road information provision system 4, the weather information provision system 5, the network 6, and the vehicle transmission information provision apparatus 7 are an example of one or more information provision apparatuses that are providers of information to be acquired by the driving assistance information delivery apparatus 1. The one or more information provision apparatuses are not limited to the example illustrated in FIG. 1, and may be one or more of the traffic control system 2, the geographic information provision system 3, the road information provision system 4, the weather information provision system 5, the network 6, and the vehicle transmission information provision apparatus 7, or may include an apparatus(es) other than these. The one or more information provision apparatuses may be operated by different business operators.

As illustrated in FIG. 1, the driving assistance information delivery apparatus 1 includes an information acquisition unit 11, a requirement item storage unit 12, a requirement item extraction unit 13, and an information delivery unit 14. The information acquisition unit 11 acquires information from each of the traffic control system 2, the geographic information provision system 3, the road information provision system 4, the weather information provision system 5, the network 6, and the vehicle transmission information provision apparatus 7, and passes the acquired information to the requirement item extraction unit 13.

The requirement item storage unit 12 stores requirement items defined by an ODD. For example, Guideline regarding Safety Technology for Automated Vehicles of the Ministry of Land, Infrastructure, Transport and Tourism illustrates road conditions, geographical conditions, environmental conditions, and other conditions as driving environment conditions, and prescribes that the ODD be set for these conditions. The road conditions include road types, the number of lanes, and the presence or absence of roads dedicated to automated driving. The geographical conditions include geographical attributes such as mountainous areas and urban areas. The environmental conditions include the weather and time zones. The other conditions include speed limits and the necessity or non-necessity of infrastructure coordination. The infrastructure coordination is an automated driving method using information acquired from an apparatus other than the vehicles 8, such as a communication apparatus that delivers signal information etc.

Note that the ODD is not limited to Guideline regarding Safety Technology described above, and may be prescribed by another standardization document or the like. The requirement items defined by the ODD described in the present embodiment are not limited to those in Guideline regarding Safety Technology described above, and may be any requirement items defined for use in determining whether or not the restriction of automated driving is necessary. Criteria themselves for determining whether or not the restriction of automated driving is necessary using information on these requirement items may be defined according to the performance of each vehicle etc. The requirement items themselves used for the determination may include items commonly defined. In the present embodiment, the driving assistance information delivery apparatus 1 acquires the requirement items for which it is prescribed that the ODD be set, by receiving input of them from an operator or receiving them from another apparatus (not illustrated), for storage in the requirement item storage unit 12. Note that requirement items stored in the requirement item storage unit 12 are not limited to the requirement items defined as the ODD, and may be any requirement items similar to the ODD, used for determining whether or not the restriction of automated driving is necessary. Details of the requirement items will be described later.

The requirement item extraction unit 13 extracts information for determining whether or not the restriction of automated driving or driving assistance functions is necessary from the information acquired by the information acquisition unit 11. Specifically, the requirement item extraction unit 13 extracts information corresponding to the requirement items from the information received from the information acquisition unit 11, using the requirement items stored in the requirement item storage unit 12, and outputs the extracted information as the driving assistance information to the information delivery unit 14. The information delivery unit 14 delivers the received driving assistance information to the vehicles 8-1 to 8-n. That is, the information delivery unit 14 delivers the information extracted by the requirement item extraction unit 13 as the driving assistance information. The requirement items include information that varies depending on locations, such as the weather and the road type. When an apparatus through which the driving assistance information is delivered to the vehicles 8-1 to 8-n, such as an antenna or a radio communication apparatus installed on an expressway or at an IR facility, is associated in advance with an area corresponding to the apparatus, the driving assistance information delivery apparatus 1 extracts, for each apparatus, information about the corresponding area for transmission as the driving assistance information.

When a communication channel between the driving assistance information delivery apparatus 1 and the vehicles 8-1 to 8-n is a channel not limited in area, such as vehicle-to-vehicle communication or a mobile phone network, a deliverable range may be divided into a plurality of areas, information corresponding to the requirement items may be extracted for each of the divided areas, and the information on the plurality of areas may be included in the driving assistance information. In this case, in the driving assistance information, information indicating the locations of the areas and the information corresponding to the requirement items on the areas are stored on an individual area basis. Furthermore, according to the location of an apparatus that relays communication between the driving assistance information delivery apparatus 1 and the vehicles 8-1 to 8-n, a corresponding area may be determined, and information on the determined area may be included in the driving assistance information to be delivered to the relay apparatus. The driving assistance information delivery apparatus 1 may acquire the location of the vehicle 8 from the vehicle 8 and deliver information on an area around the vehicle 8 according to the location of the vehicle 8 as the driving assistance information. For example, the driving assistance information delivery apparatus 1 may deliver information about an area at a distance smaller than or equal to a threshold from the location of the vehicle 8 as the driving assistance information to the vehicle 8.

As illustrated in FIG. 1, the vehicle 8-1 includes a communication unit 81, a vehicle control unit 82, vehicle components 83, an on-board sensor 84, a determination condition storage unit 85, a display unit 86, and an input receiving unit 87. As described above, the communication unit 81 receives the driving assistance information transmitted from the driving assistance information delivery apparatus 1 through any communication channel such as an antenna on an expressway or vehicle-to-vehicle communication, and outputs the received driving assistance information to the vehicle control unit 82. If the vehicle 8-1 is a vehicle connectable to the vehicle transmission information provision apparatus 7 via a network, the communication unit 81 transmits at least some of the measurement results measured by the on-board sensor 84 and the information managed by the vehicle control unit 82 as vehicle transmission information to the vehicle transmission information provision apparatus 7 via the network. The on-board sensor 84 is, for example, at least one of a radar, a lidar, and a camera. The on-board sensor 84 may include a vibration sensor that detects vibrations.

The vehicle components 83 are various apparatuses mounted on the vehicle 8-1, such as an engine, a brake, and a transmission. The vehicle control unit 82, which is a vehicle control device, can control the vehicle components 83 using the results of measurement by the on-board sensor 84 without needing a driver's or human operation. That is, the vehicle control unit 82 can perform automated driving. The vehicle control unit 82 can switch between automated driving and manual driving in which driving operations are manually performed by the driver, in response to an instruction from the driver, for example. Upon receiving the driving assistance information from the communication unit 81, the vehicle control unit 82 determines whether or not the restriction of automated driving is necessary, using the driving assistance information and determination conditions stored in the determination condition storage unit 85. The determination conditions are information indicating conditions for determining whether or not the restriction of automated driving or driving assistance functions is necessary, using information corresponding to each of the above-described requirement items. The vehicle control unit 82 causes the display unit 86 to display information to be presented to the driver. For example, when the vehicle control unit 82 has determined that the restriction of automated driving is necessary, the vehicle control unit 82 causes the display unit 86 to display the determination result.

Note that automated driving is, for example, of Level 3 or higher defined by the Society of Automotive Engineers of the United States. As described above, the vehicle 8-1 may have driving assistance functions of Level 1 or 2. In this case, the vehicle control unit 82 performs part of the control of the vehicle components 83 without needing the driver's operation. Upon receiving the driving assistance information, the vehicle control unit 82 determines whether or not the restriction of driving assistance functions is necessary, using the driving assistance information and the determination conditions stored in the determination condition storage unit 85.

The determination condition storage unit 85 stores the determination conditions. The determination conditions are, for example, conditions set as the ODD. The vehicle 8-1 acquires the determination conditions by receiving input of them from an operator at the time of initial setting or inspection of the vehicle 8-1 or receiving them from another apparatus (not illustrated), for storage in the determination condition storage unit 85. Details of the determination conditions will be described later.

The display unit 86 presents various types of information to the driver by performing screen display. The input receiving unit 87 receives input from the driver and notifies the vehicle control unit 82 of the received input. For example, upon receiving input of an instruction to switch from automated driving to manual driving or to switch from manual driving to automated driving, the input receiving unit 87 notifies the vehicle control unit 82 of the received instruction. Although not illustrated, the vehicles 8-2 to 8-n have the same configuration as the vehicle 8-1. However, specific apparatuses of the vehicle components 83 and the on-board sensor 84 do not need to be the same in all the vehicles 8. Specific apparatuses of the vehicle components 83 and the on-board sensor 84 of at least some of the vehicles 8 may be different from each other.

Figure 2:
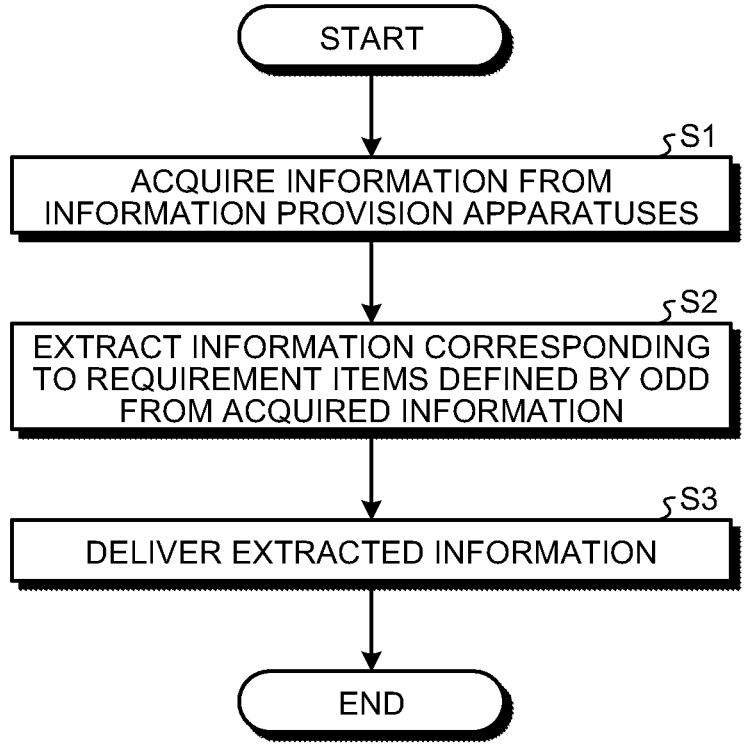
FIG. 2 is a flowchart illustrating an example of a driving assistance information delivery processing procedure in the driving assistance information delivery apparatus of the first embodiment.

Next, the operation of the present embodiment will be described. FIG. 2 is a flowchart illustrating an example of a driving assistance information delivery processing procedure in the driving assistance information delivery apparatus 1 of the present embodiment. As illustrated in FIG. 1, the driving assistance information delivery apparatus 1 acquires information from the information provision apparatuses (step S1). The information provision apparatuses are, for example, the traffic control system 2, the geographic information provision system 3, the road information provision system 4, the weather information provision system 5, the network 6, and the vehicle transmission information provision apparatus 7 described above, but may be some of them or may include an apparatus(es) other than these.

In step S1, specifically, the information acquisition unit 11 acquires congestion information, regulatory information, etc. from the traffic control system 2, acquires the geographical attributes of individual areas, school zones, etc. from the geographic information provision system 3, acquires road design information from the road information provision system 4, acquires information about the weather from the weather information provision system 5, acquires information posted on social media, SNSs, etc. from the network 6, and acquires vehicle transmission information from the vehicle transmission information provision apparatus 7. The information acquisition unit 11 outputs the acquired information to the requirement item extraction unit 13.

Next, the driving assistance information delivery apparatus 1 extracts information corresponding to the requirement items defined by the ODD from the acquired information (step S2). Specifically, the requirement item extraction unit 13 refers to the requirement items stored in the requirement item storage unit 12, and extracts information corresponding to the requirement items from the information received from the information acquisition unit 11. The requirement items are represented by an item corresponding to at least one of the geographical conditions, the road conditions, the environmental conditions, the traffic conditions, and the infrastructure coordination conditions described above, for example. The requirement items include location-dependent information such as geographical attributes and information about the weather. When an apparatus through which the driving assistance information is delivered to the vehicles 8-1 to 8-n is associated in advance with an area corresponding to the apparatus, the requirement item extraction unit 13 extracts, for each apparatus, information about the corresponding area. There may be two or more areas corresponding to each apparatus. When a communication channel between the driving assistance information delivery apparatus 1 and the vehicles 8-1 to 8-n is a channel not limited in area, such as vehicle-to-vehicle communication or a mobile phone network, for each relay apparatus, a range corresponding to the apparatus is divided into a plurality of areas, and information corresponding to the requirement items is extracted for each of the divided areas. When the requirement item extraction unit 13 has extracted information for the plurality of areas on an individual area basis, the requirement item extraction unit 13 notifies the information delivery unit 14 of the extracted information together with information indicating the locations of the corresponding areas. When information to be delivered differs depending on relay apparatuses that are apparatuses through which the driving assistance information delivery apparatus 1 communicates with the vehicles 8-1 to 8-n, that is, when the relay apparatuses correspond to different areas, the requirement item extraction unit 13 extracts information for each relay apparatus, and notifies the information delivery unit 14 of the extracted information together with identification information indicating the relay apparatuses.

Figure 3:
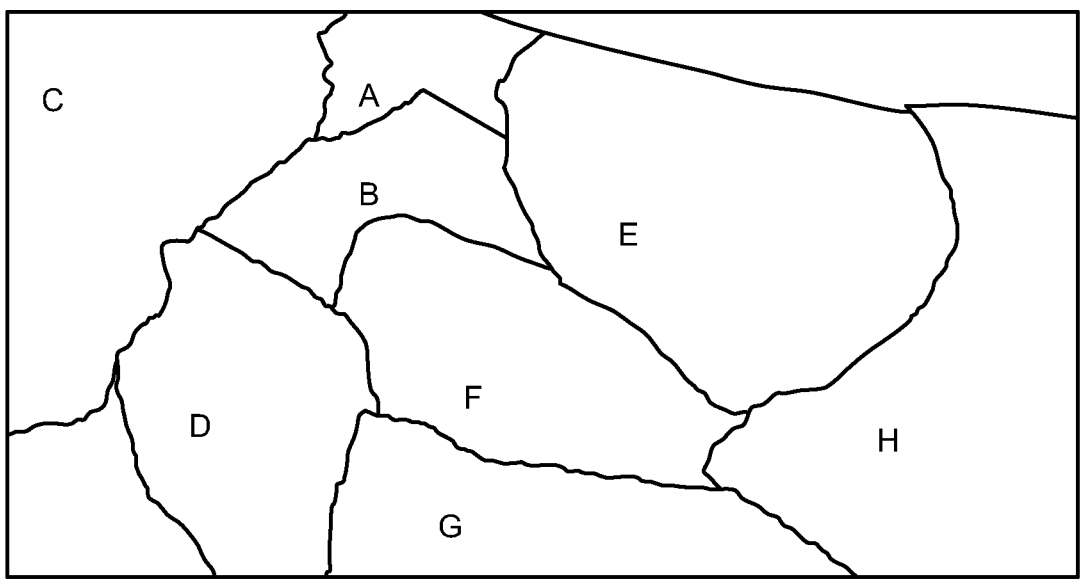
FIG. 3 is a schematic diagram illustrating an example of divided areas in the first embodiment.

FIG. 3 is a schematic diagram illustrating an example of divided areas in the present embodiment. In FIG. 3, areas A, B, C, D, E, F, G, and H are illustrated. For example, the requirement item extraction unit 13 extracts information corresponding to the requirement items defined by the ODD for each of the areas A, B, C, D, E, F, G, and H, and notifies the information delivery unit 14 of the extracted information together with information indicating the location of each area.

Information posted on social media, SNSs, etc. has high immediacy but may have low reliability. Therefore, for information posted on social media, SNSs, etc., the requirement item extraction unit 13 makes a determination about reliability and then uses the information if the information is found to be reliable. For example, the requirement item extraction unit 13 compares the information with information provided from the other information provision apparatuses, and does not use the information if the information does not match. Alternatively, the requirement item extraction unit 13 uses the information to which flag information indicating the level of reliability is added.

The description returns to FIG. 2. The driving assistance information delivery apparatus 1 delivers the extracted information (step S3), and completes the processing. Specifically, the information delivery unit 14 delivers the information of which notification is made by the requirement item extraction unit 13 as the driving assistance information to the vehicles 8-1 to 8-n. When relay apparatuses correspond to different areas, the information delivery unit 14 delivers the driving assistance information corresponding to each relay apparatus to the relay apparatus, so that the driving assistance information is delivered from each relay apparatus to the vehicles 8-1 to 8-n. At this time, for each relay apparatus, it is desirable to include information on areas through which the vehicles 8 that have received the information delivered from the relay apparatus are expected to pass in the future. For example, in the driving assistance information delivered to a relay apparatus installed in the area C illustrated in FIG. 3, information on the area C and information on the areas A, B, D, etc. adjacent to the area C are included. That is, the driving assistance information includes information for determining whether or not the restriction of automated driving or driving assistance functions is necessary in areas adjacent to an area where the driving assistance information is received by the vehicles 8.

Figure 4:
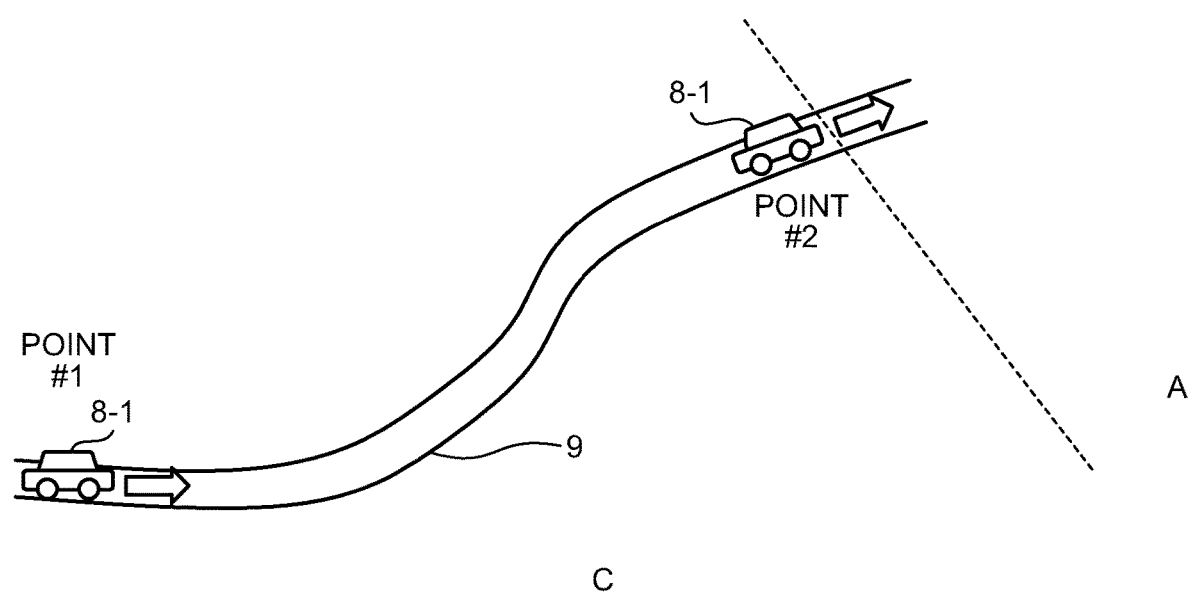
FIG. 4 is a schematic diagram illustrating the relationship between a route traveled by a vehicle of the first embodiment and areas.

FIG. 4 is a schematic diagram illustrating the relationship between a travel route of the vehicle 8-1 of the present embodiment and areas. In an example illustrated in FIG. 4, the vehicle 8-1 is driven on a road 9, traveling from the area C to the area A. The vehicle 8-1 receives the driving assistance information at point #1 in the area C. The driving assistance information includes information on the area A. Suppose, for example, that in the area A, the amount of snow exceeds an automated driving possible range defined by a determination condition in the ODD. In this case, by receiving the driving assistance information at point #1, the vehicle 8-1 can grasp the fact that automated driving will become impossible in the area A before reaching the area A, and notify the driver of the fact. The vehicle can also determine whether or not the restriction of automated driving or driving assistance functions is necessary, using information detected by the on-board sensor 84. However, the on-board sensor 84 cannot acquire medium-to-long-distance information. For example, the on-board sensor 84 detects information about the environment. The on-board sensor 84 detects the amount of snow. When the vehicle 8-1 reaches point #2 that is the boundary between the area C and the area A, the vehicle 8-1 can determine that automated driving is impossible. However, in this case, the driver will suddenly start manual driving. In contrast, when the driver is notified at point #1 of the fact that automated driving will become impossible in the area A, the driver can switch from automated driving to manual driving at a desired time before reaching the area A. This can prevent the driver from suddenly starting manual driving, and allows the driver to switch to manual driving at a desired point of time before reaching the area A.

Note that the driving assistance information delivery apparatus 1 may acquire information from the information provision apparatuses in the same cycle or different cycles. When the cycle in which the driving assistance information delivery apparatus 1 acquires information from each information provision apparatus is not the same, the driving assistance information delivery apparatus 1 holds the acquired information in a buffer memory or the like (not illustrated), reads the information in each cycle in which the driving assistance information delivery apparatus 1 delivers the driving assistance information to the vehicles 8-1 to 8-$n$, and performs step S2 and the subsequent step.

When the driving assistance information delivery apparatus 1 delivers the driving assistance information according to the locations of the vehicles 8, the driving assistance information delivery apparatus 1 acquires the locations of the vehicles 8 from the vehicles 8, and extracts, for each vehicle 8, information on a corresponding area for delivery as the driving assistance information. Although FIG. 2 illustrates an example in which the requirement items defined by the ODD are extracted, the requirement items are not limited to the ODD, and may be any requirement items for determining whether or not the restriction of automated driving is necessary or whether to enable or disable driving assistance functions, as described above.

Next, operation in the vehicle 8 will be described. FIG. 5 is a flowchart illustrating an example of a processing procedure at the time of receiving the driving assistance information in the vehicle 8 of the present embodiment. As illustrated in FIG. 5, the vehicle 8 determines whether or not the vehicle 8 has received the driving assistance information (step S11). When the vehicle 8 has not received the driving assistance information (No in step S11), the vehicle 8 repeats step S11. Specifically, in step S11, the vehicle control unit 82 determines whether or not the vehicle 8 has received the driving assistance information via the communication unit 81.

When the vehicle 8 has received the driving assistance information (Yes in step S11), the vehicle 8 determines whether or not the restriction of automated driving is necessary, based on the driving assistance information and the determination conditions (step S12). As described above, the determination conditions are, for example, conditions defined as the ODD, conditions for determining whether or not the restriction of automated driving is necessary, which are stored in the determination condition storage unit 85. In step S12, specifically, the vehicle control unit 82 determines whether or not the restriction of automated driving is necessary, using the determination conditions stored in the determination condition storage unit 85 and the driving assistance information received from the communication unit 81.

When the result of the determination in step S12 is that the restriction of automated driving is necessary (Yes in step S13), the vehicle control unit notifies the driver of the fact (step S14), and repeats the processing from step S11. In step S14, for example, the vehicle control unit 82 causes the display unit 86 to display the content of the restriction of automated driving to notify the driver of the fact that automated driving is restricted. Alternatively, the vehicle control unit 82 may notify the driver of the fact that automated driving is restricted by voice using a speaker or the like not illustrated in FIG. 1. In step S14, the vehicle control unit 82 causes the display unit 86 to display the content of the restriction of automated driving, and at the same time, may cause the display unit 86 to display a different route without the restriction of automated driving, to accept the choice of whether or not to select the different route from the driver.

When the result of the determination in step S12 is that the restriction of automated driving is not necessary (No in step S13), the vehicle control unit repeats the processing from step S11. If the driving assistance information includes information on an area where the vehicle 8 is currently located, the current determination result is displayed in step S14. If the driving assistance information includes information on an area where the vehicle 8 is to travel, in step S14, the vehicle control unit 82 makes notification of the distance to the area or the time expected to be taken to reach the area, as well as advance notice that automated driving will be restricted. The vehicle control unit 82 grasps the current location using a Global Positioning System (GPS) receiver or the like not illustrated in FIG. 1, and also grasps the travel route. Thus, the vehicle control unit 82 determines whether or not the driving assistance information is information on an area to be traveled, using these pieces of information.

FIG. 6 is a diagram illustrating an example of a screen displayed by the display unit 86 of the present embodiment. FIG. 6 illustrates an example of a screen displayed in step S14 when it is determined in step S12 described above that the restriction of automated driving is necessary in an area where the vehicle 8 is to travel. For example, as illustrated in FIG. 6, the vehicle control unit 82 causes the display unit 86 to display a screen such as "Automated driving is not possible in area A 10 km ahead.", thereby allowing the driver to grasp the distance before automated driving becomes impossible. As illustrated in FIG. 6, a button for selecting switching to manual driving may be displayed by the display unit 86. This example shows an example in which the display unit 86 is integrated with the input receiving unit 87 to be implemented by a touch panel or the like. However, a method of switching to manual driving is not limited to this example. Switching may be performed using another operation means. The arrangement of a specific screen displayed by the display unit 86 and the contents of display are not limited to the example illustrated in FIG. 6.

Here, an example of the restriction of automated driving will be described. FIG. 7 is a diagram illustrating an example of requirements defined by the ODD and regulations in the present embodiment. FIG. 7 illustrates the identification numbers of definitions, used information, that is, the requirement items, the determination conditions, and the corresponding regulations. Here, as the driving environment conditions for which the ODD is set, geographical conditions, road conditions, environmental conditions, traffic conditions, and infrastructure coordination conditions are considered. The traffic conditions and the infrastructure coordination conditions are included in the other conditions described above.

For example, in definition #1, it is defined that information indicating a communication environment, which is information corresponding to an infrastructure coordination condition, is used as information (a requirement item) used for determination, and when the communication environment is faulty or partly faulty, it is determined that restriction is necessary. Furthermore, in definition #1, the content of restriction or a regulation when it is determined that restriction is necessary is defined as the prohibition of automated driving using infrastructure coordination. In definition #2, it is defined that a geographical attribute, which is an example of a geographical condition, and the presence or absence of a sidewalk, which is an example of a road condition, are set as requirement items, and when the geographical attribute is a school zone and information indicating the presence or absence of a sidewalk indicates the absence of a sidewalk, it is determined that the restriction of automated driving is necessary. Furthermore, in definition #2, the content of restriction or a regulation when it is determined that restriction is necessary is defined as the prohibition of automated driving. For these examples, the vehicle 8 may not determine whether or not automated driving is possible, but instead, as legal regulations, the driving assistance information delivery apparatus 1 may transmit information as uniform automated driving prohibition regulations, regardless of what type of vehicle (a light vehicle, a four-wheel drive vehicle, a large vehicle, etc.) the vehicle 8 is.

In definition #3, it is defined that the amount of snow, which is an example of an environmental condition, and the presence or absence of chain regulation, which is an example of a traffic condition, are set as requirement items, and when the amount of snow is higher than or equal to H cm and chain regulation is imposed, it is determined that the restriction of automated driving is necessary. Furthermore, in definition #3, the content of restriction or a regulation when it is determined that restriction is necessary is defined as the prohibition of automated driving if the vehicle is not equipped with chains or snow tires, and the permission of automated travel at XX km/h or lower if the vehicle is not equipped with chains or snow tires.

In definition #4, it is defined that the number of lanes, which is an example of a road condition, and the traffic volume, which is an example of a traffic condition, are set as requirement items, and when the traffic volume per lane is M vehicles/km or more, it is determined that the restriction of automated driving is necessary. Furthermore, in definition #4, the content of restriction or a regulation when it is determined that restriction is necessary is defined as the permission of only automated travel by tracking a preceding vehicle at YY km/h or lower.

In definition #5, it is defined that a communication environment, which is an example of an infrastructure coordination condition, and the presence or absence of a lane dedicated to automated driving, which is an example of a road condition, are set as requirement items, and when communication is faulty or communication is partly faulty, it is determined that the restriction of automated driving is necessary. Furthermore, in definition #5, the content of restriction or a regulation when it is determined that restriction is necessary is defined as the permission of automated driving only in a lane dedicated to automated driving. Thus, in definition #5, when communication is faulty or communication is partly faulty, if there is a lane dedicated to automated driving, the vehicle travels in the lane dedicated to automated driving, and if there is no lane dedicated to automated driving, automated driving is prohibited. For these examples, the vehicle 8 may not determine whether or not automated driving is possible, but instead, as legal regulations, the driving assistance information delivery apparatus 1 may transmit information as uniform automated driving prohibition regulations, regardless of what type of vehicle (a light vehicle, a four-wheel drive vehicle, a large vehicle, etc.) the vehicle 8 is.

Definitions #1 to #5 described above are examples, and definitions of the ODD are not limited to these. Furthermore, two or more of definitions #1 to #5 described above may be used. The requirement items for which it is prescribed that the ODD be set are commonly defined by a standardization document or the like. On the other hand, the determination conditions may be defined by the manufacturers of the vehicles 8 or the like because the determination conditions vary depending on the vehicle types etc. In the present embodiment, the requirement items are stored by the driving assistance information delivery apparatus 1 as described above. The driving assistance information delivery apparatus 1 extracts information corresponding to the requirement items from information received from the various information provision apparatuses and transmits the extracted information as the driving assistance information to the vehicles 8, as described above. However, for the examples as in definitions #1, #2, and #5, the vehicles 8 may not determine whether or not automated driving is possible, but instead, as legal regulations, the driving assistance information delivery apparatus may transmit information as uniform automated driving prohibition regulations, regardless of what types of vehicles (a light vehicle, a four-wheel drive vehicle, a large vehicle, etc.) the vehicles 8 are.

Figures 10, 11:
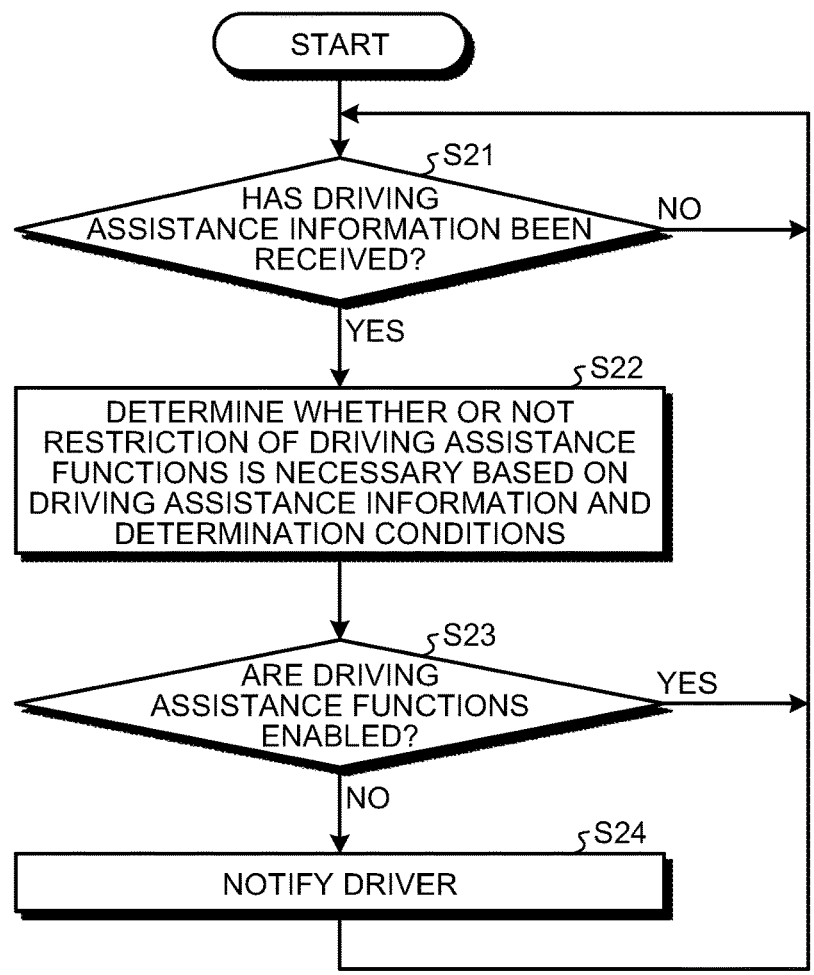
FIG. 10 is a diagram illustrating an example of information corresponding to road conditions in the driving assistance information of the first embodiment.
FIG. 11 is a flowchart illustrating an example of a processing procedure at the time of receiving the driving assistance information in the vehicle of the first embodiment having driving assistance functions.

FIG. 8 is a diagram illustrating an example of information corresponding to geographical conditions in the driving assistance information of the present embodiment. FIG. 9 is a diagram illustrating an example of information corresponding to infrastructure coordination conditions in the driving assistance information of the present embodiment. FIG. 10 is a diagram illustrating an example of information corresponding to road conditions in the driving assistance information of the present embodiment. Thus, the information corresponding to the requirement items of the respective conditions is stored in the driving assistance information on an individual area basis. Although not illustrated, environmental conditions and traffic conditions are likewise stored in the driving assistance information on an individual area basis. Information corresponding to these pieces of information is stored in the driving assistance information together with information indicating the locations of the areas. If the target of delivery is a single area, the driving assistance information may not include information indicating the location of the area. The driving assistance information is not limited to a specific format.

In the above example, the restriction of automated driving has been described as an example. However, as described above, the driving assistance information may be used for determining whether to enable or disable driving assistance. In this case, the driving assistance information delivery apparatus 1 extracts information on requirement items for determining whether to enable or disable driving assistance functions for delivery as the driving assistance information, and the vehicles 8 have driving assistance functions and store determination conditions for determining whether to enable or disable the driving assistance functions. FIG. 11 is a flowchart illustrating an example of a processing procedure at the time of receiving the driving assistance information in the vehicle 8 of the present embodiment having driving assistance functions.

Step S21 is the same as step S11. In step S22, the vehicle control unit 82 determines whether or not the restriction of the driving assistance functions is necessary, based on the driving assistance information and the determination conditions. When the result of the determination in step S22 is that the driving assistance functions are disabled (No in step S23), the vehicle control unit 82 makes notification to the driver (step S24), and repeats the processing from step S21. In step S24, for example, the vehicle control unit 82 makes notification to the driver by causing the display unit 86 to display the fact that the driving assistance functions are disabled. Alternatively, the vehicle control unit 82 may make notification that the driving assistance functions are disabled by voice using a speaker or the like not illustrated in FIG. 1.

When the result of the determination in step S22 is that the driving assistance functions are enabled (Yes in step S23), the vehicle control unit 82 repeats the processing from step S21. If the driving assistance information includes information on an area where the vehicle 8 is currently located, the vehicle control unit 82 displays the current determination result in step S24 as in the case of restricting automated driving. If the driving assistance information includes information on an area where the vehicle 8 is to travel, in step S24, the vehicle control unit 82 makes notification of the distance to the area or the time expected to be taken to reach the area, as well as advance notice that the driving assistance functions will be disabled.

In the example illustrated in FIG. 11, it is determined whether to enable or disable the driving assistance functions. Instead, it may be determined whether or not the restriction of the driving assistance functions is necessary. That is, an example of the determination of whether or not the restriction of driving assistance functions is necessary is the determination of whether to enable or disable driving assistance functions.

Figure 12:
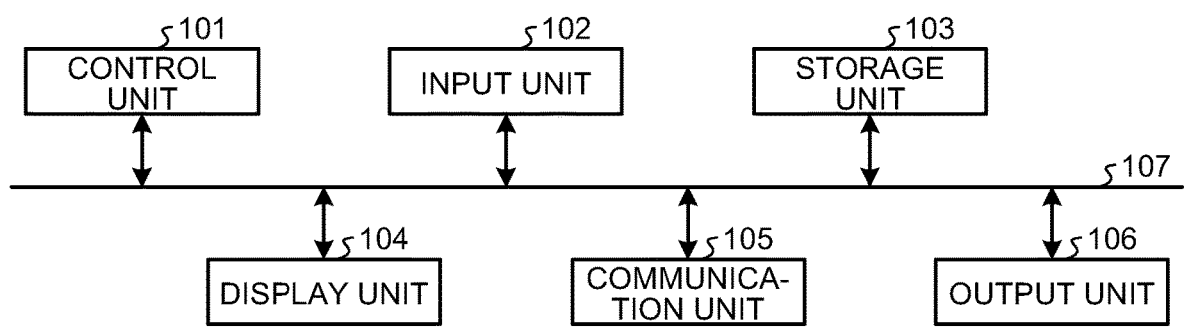
FIG. 12 is a diagram illustrating a configuration example of a computer system for implementing the driving assistance information delivery apparatus of the first embodiment.

Next, a hardware configuration of the driving assistance information delivery apparatus 1 of the present embodiment will be described. For the driving assistance information delivery apparatus 1 of the present embodiment, a computer system functions as the driving assistance information delivery apparatus 1 by a driving assistance information delivery program that is a computer program in which the processing in the driving assistance information delivery apparatus 1 is described, being executed on the computer system. FIG. 12 is a diagram illustrating a configuration example of the computer system that implements the driving assistance information delivery apparatus 1 of the present embodiment. As illustrated in FIG. 12, the computer system includes a control unit 101, an input unit 102, a storage unit 103, a display unit 104, a communication unit 105, and an output unit 106, which are connected via a system bus 107.

In FIG. 12, the control unit 101 is, for example, a processor such as a central processing unit (CPU), and executes the driving assistance information delivery program in which the processing in the driving assistance information delivery apparatus 1 of the present embodiment is described. The input unit 102 includes, for example, a keyboard and a mouse, and is used by a user of the computer system to input various types of information. The storage unit 103 includes various types of memory such as random-access memory (RAM) and read-only memory (ROM) and a storage device such as a hard disk, and stores the program to be executed by the control unit 101, necessary data obtained during the processing, etc. The storage unit 103 is also used as a program temporary storage area. The display unit 104 includes a display, a liquid crystal display (LCD) panel, or the like, and displays various screens for the user of the computer system. The communication unit 105 is a receiver and a transmitter that perform communication processing. The output unit 106 is a speaker or the like. Note that FIG. 12 is an example, and the configuration of the computer system is not limited to the example of FIG. 12.

Here, an example of operation of the computer system before the driving assistance information delivery program of the present embodiment becomes executable will be described. In the computer system having the above-described configuration, the driving assistance information delivery program is installed in the storage unit 103 from, for example, a compact disc (CD)-ROM or a digital versatile disc (DVD)-ROM set in a CD-ROM drive or a DVD-ROM drive (not illustrated). At the time of execution of the driving assistance information delivery program, the driving assistance information delivery program read from the storage unit 103 is stored in the storage unit 103. In this state, the control unit 101 performs processing as the driving assistance information delivery apparatus 1 of the present embodiment, according to the program stored in the storage unit 103.

In the above description, the program describing the processing in the driving assistance information delivery apparatus 1 is provided using the CD-ROM or DVD-ROM as a recording medium, which is not limiting. For example, the program provided through a transmission medium such as the Internet via the communication unit 105 may be used, depending on the configuration of the computer system, the capacity of the provided program, etc.

The requirement item extraction unit 13 illustrated in FIG. 1 is implemented by the driving assistance information delivery program stored in the storage unit 103 illustrated in FIG. 12 being executed by the control unit 101 illustrated in FIG. 12. The requirement item storage unit 12 illustrated in FIG. 1 is part of the storage unit 103 illustrated in FIG. 12. The information acquisition unit 11 and the information delivery unit 14 illustrated in FIG. 1 are implemented by the communication unit 105 illustrated in FIG. 12. The driving assistance information delivery apparatus 1 may be implemented by a plurality of computer systems.

For example, the driving assistance information delivery program of the present embodiment causes the driving assistance information delivery apparatus 1 to perform a step of acquiring information from one or more information provision apparatuses, a step of extracting, from the acquired information, information for determining whether or not the restriction of automated driving or driving assistance functions is necessary, and a step of delivering the extracted information as driving assistance information.

The vehicle control unit 82 in the vehicle 8 of the present embodiment is implemented by a vehicle control program stored in the storage unit 103 illustrated in FIG. 12 being executed by a control unit like the control unit 101 illustrated in FIG. 12. The determination condition storage unit 85 is implemented by a storage unit like the storage unit 103 illustrated in FIG. 12. The display unit 86 is implemented by a display, a monitor, or the like, like the display unit 104 illustrated in FIG. 12. The input receiving unit 87 is implemented by an operation button or the like. As described above, the display unit 104 may be integrated with the input receiving unit 87 to be implemented by a touch panel or the like.

As described above, the driving assistance information delivery apparatus 1 of the present embodiment extracts, from information acquired from information provision apparatuses, information corresponding to the requirement items that is information for determining whether or not the restriction of automated driving or driving assistance functions is necessary, and delivers the extracted information to the vehicles 8 as the driving assistance information. Thus, information indicating driving environment conditions for determining whether or not the restriction of automated driving or driving assistance functions is necessary can be provided to the vehicles 8. Furthermore, by including, in the driving assistance information, information on an area other than an area where the vehicle 8 receives the driving assistance information, advance notification of the restriction of automated driving or driving assistance functions in an area where the vehicle 8 is to travel can be given to the driver to avoid sudden start of manual operation for the driver.

Second Embodiment

Figure 13:
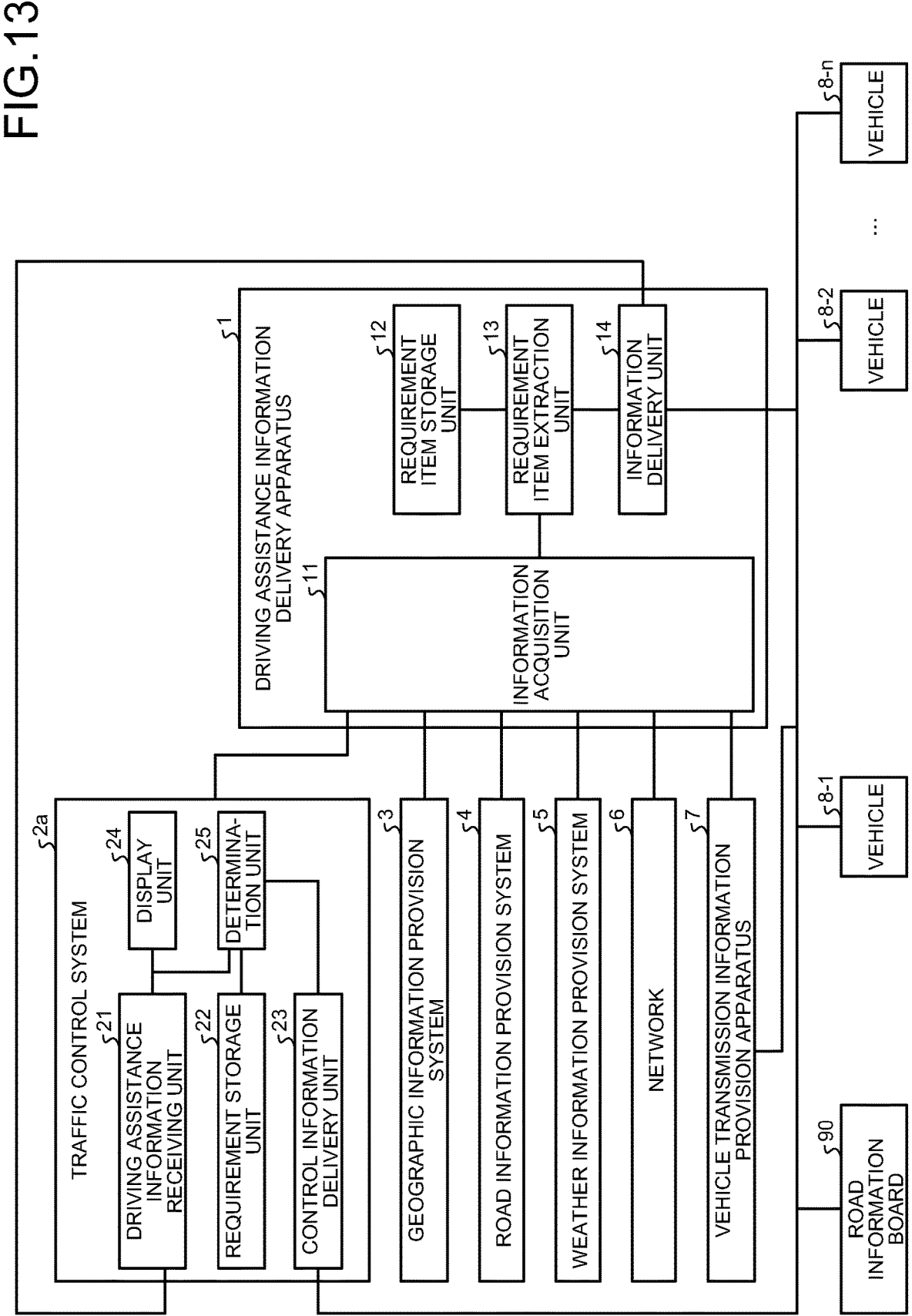
FIG. 13 is a diagram illustrating a configuration example of a traffic system according to a second embodiment.

FIG. 13 is a diagram illustrating a configuration example of a traffic system according to a second embodiment. In the present embodiment, a traffic system includes the same driving assistance information delivery apparatus 1 as that of the first embodiment, the same vehicles 8-1 to 8-n as those of the first embodiment, and a traffic control system 2a. However, the driving assistance information delivery apparatus 1 also delivers driving assistance information to the traffic control system 2a as well as to the vehicles 8. The same reference numerals as those in the first embodiment are assigned to components having the same functions as those of the first embodiment without duplicated explanations. Hereinafter, differences from the first embodiment will be mainly described.

The traffic control system 2a has the function of the traffic control system 2 of the first embodiment, and receives driving assistance information transmitted from the driving assistance information delivery apparatus 1, and delivers control information indicating whether or not the restriction of automated driving or driving assistance functions is necessary to the vehicles 8, using the received driving assistance information. As illustrated in FIG. 13, the traffic control system 2a includes a driving assistance information receiving unit 21, a requirement storage unit 22, a control information delivery unit 23, a display unit 24, and a determination unit 25.

The driving assistance information receiving unit 21 receives driving assistance information from the driving assistance information delivery apparatus 1, and outputs the received driving assistance information to the display unit 24 and the determination unit 25. The requirement storage unit 22 stores regulatory requirements that are conditions for determining whether or not to perform traffic regulation. Of the conditions for determining whether or not the restriction of automated driving is necessary based on the ODD, the regulatory requirements may be those common among the vehicles 8, or may be conditions according to the types of the vehicles 8 or the like. Furthermore, the regulatory requirements may be conditions defined commonly and separately from the ODD, for determining whether or not to regulate automated driving or driving assistance. That is, it is included that the vehicles 8 do not determine whether or not automated driving is possible according to their respective vehicle performance or the like, but as a legal regulation, the traffic control system 2a transmits information as a uniform automated driving prohibition regulation, regardless of what types of vehicles (a light vehicle, a four-wheel drive vehicle, a large vehicle, etc.) the vehicles 8 are, or delivers information as a legal regulation by specifying a type of the vehicles 8.

The display unit 24 displays the received driving assistance information. This allows an operator of the traffic control system 2a to grasp the current state of each area and perform an additional traffic control action required. The display unit 24 may display the driving assistance information in graph form or may display the results of performing statistical processing such as calculating time average.

The determination unit 25 determines whether or not the restriction of automated driving or driving assistance functions is necessary, using the information acquired by the driving assistance information receiving unit 21. Specifically, the determination unit 25 determines whether or not to perform regulation for each area, using the driving assistance information received from the driving assistance information receiving unit 21 and the regulatory requirements stored in the requirement storage unit 22. When there is an area where regulation is performed, the determination unit 25 notifies the control information delivery unit 23 of information indicating the content of the regulation as control information.

The control information delivery unit 23 delivers the control information to the vehicles 8-1 to 8-n. That is, the control information delivery unit 23 delivers the result of the determination by the determination unit 25 as the control information to the vehicles 8-1 to 8-n. For a communication channel between the traffic control system 2a and the vehicles 8-1 to 8-n, any communication channel can be used.

In the example illustrated in FIG. 13, the driving assistance information described in the first embodiment is used. However, information used by the traffic control system 2a to determine whether or not to regulate automated driving or driving assistance functions is not limited to the driving assistance information described in the first embodiment, and may be similar information. For example, whether or not to regulate automated driving or driving assistance functions may be determined using information received from another apparatus not illustrated in FIG. 1. Whether or not to regulate automated driving or driving assistance functions may be determined based on a weather condition, a traffic condition, etc. in each area input from the operator of the traffic control system 2a. The driving assistance information receiving unit 21 is an example of an acquisition unit that acquires information for determining whether or not the restriction of automated driving or driving assistance functions is necessary.

Figure 14:
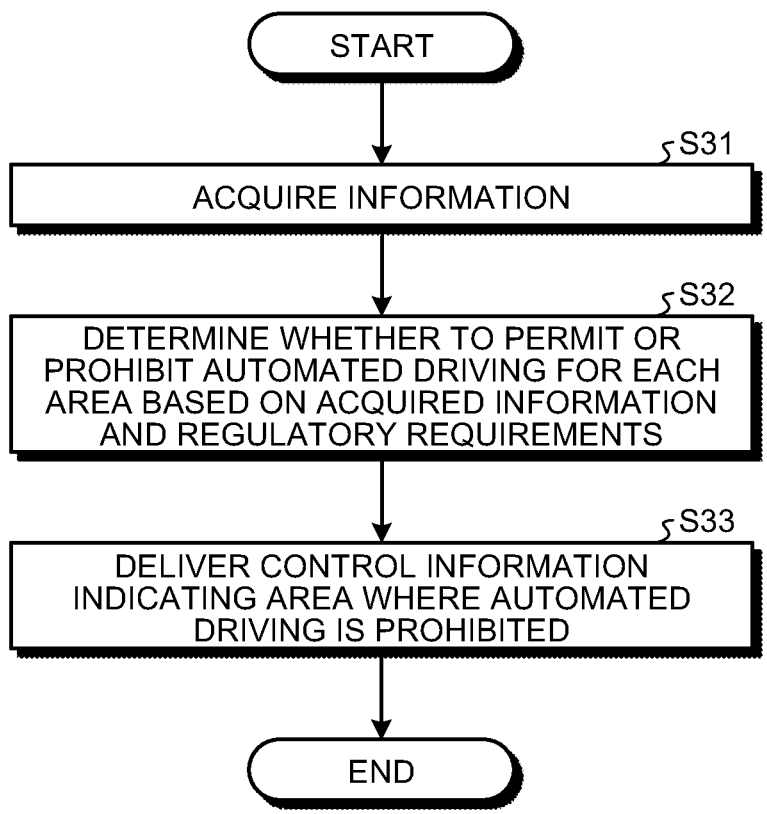
FIG. 14 is a flowchart illustrating an example of a control processing procedure in a traffic control system of the second embodiment.

FIG. 14 is a flowchart illustrating an example of a control processing procedure in the traffic control system 2a of the present embodiment. Although FIG. 14 illustrates an example of determining whether to permit or prohibit automated driving, a similar control processing can be performed on whether to enable or disable driving assistance functions. As illustrated in FIG. 14, the driving assistance information receiving unit 21 acquires information (step S31). This information is information for determining whether or not to regulate automated driving or driving assistance functions, and is, for example, the driving assistance information described in the first embodiment. The driving assistance information receiving unit 21 outputs the received information to the display unit 24 and the determination unit 25.

Next, the traffic control system 2a determines whether to permit or prohibit automated driving for each area, based on the acquired information and the regulatory requirements (step S32), and delivers control information indicating an area where automated driving is prohibited (step S33). The control information also includes an automated driving level, a vehicle type, etc. Specifically, in step S32, the determination unit 25 determines whether to permit or prohibit automated driving for each area, based on the acquired information and the regulatory requirements, generates control information indicating an area where automated driving is prohibited, an automated driving level, a vehicle type, etc., and delivers the control information to the vehicles 8 via the control information delivery unit 23. The control information may be information indicating an area where automated driving is prohibited, an automated driving level, and a vehicle type, or may be information indicating whether automated driving is permitted or prohibited on an individual area basis. As is the case with the driving assistance information in the first embodiment, according to the locations of relay apparatuses that relay communication between the traffic control system 2a and the vehicles 8, corresponding areas may be determined, and information on the corresponding areas may be stored in the control information on an individual relay apparatus basis. Upon receiving the control information, the vehicle 8 displays the control information to notify the driver. The vehicle 8 can determine whether or not the restriction of automated driving or driving assistance functions is necessary, using the control information.

The traffic control system 2a is not limited to delivering the control information to the vehicles 8, and may deliver the control information to a road information board 90 installed along a road. The road information board 90 is, for example, a variable display board installed for the purpose of providing information such as traffic congestion, a traffic accident, and the weather on the road to the drivers of the vehicles 8. By displaying the control information delivered from the traffic control system 2a, the road information board 90 can notify the drivers of information indicating an area where automated driving is prohibited, an automated driving level, and a vehicle type, or information indicating whether automated driving is permitted or prohibited on an individual area basis.

Although the above example has described an example in which the driving assistance information delivery apparatus 1 delivers the driving assistance information to the vehicles 8 as in the first embodiment, the driving assistance information delivery apparatus 1 may deliver the driving assistance information only to the traffic control system 2a without delivering the driving assistance information to the vehicles 8. Also in this case, the control information is delivered from the traffic control system 2a to the vehicles 8, so that the vehicles 8 can receive the control information as information for determining whether or not the restriction of automated driving or driving assistance functions is necessary.

Like the driving assistance information delivery apparatus of the first embodiment, the traffic control system 2a is implemented by the computer system illustrated in FIG. 12. The determination unit 25 illustrated in FIG. 13 is implemented by a control processing program stored in the storage unit 103 illustrated in FIG. 12 being executed by the control unit 101 illustrated in FIG. 12. The requirement storage unit 22 illustrated in FIG. 13 is part of the storage unit 103 illustrated in FIG. 12. The driving assistance information receiving unit 21 and the control information delivery unit 23 illustrated in FIG. 13 are implemented by the communication unit 105 illustrated in FIG. 12. The display unit 24 illustrated in FIG. 13 is implemented by the display unit 104 illustrated in FIG. 12. When the driving assistance information that has been processed is displayed, the display unit 24 is implemented by further using the control unit 101 and the storage unit 103. The traffic control system 2a may be implemented by a plurality of computer systems.

As described above, in the present embodiment, the traffic control system 2a determines whether or not to regulate automated driving or driving assistance functions, and transmits control information indicating the presence or absence of regulation to the vehicles 8. This allows provision of information for determining whether or not the restriction of automated driving or driving assistance functions is necessary to the vehicles 8.

Third Embodiment

Figure 15:
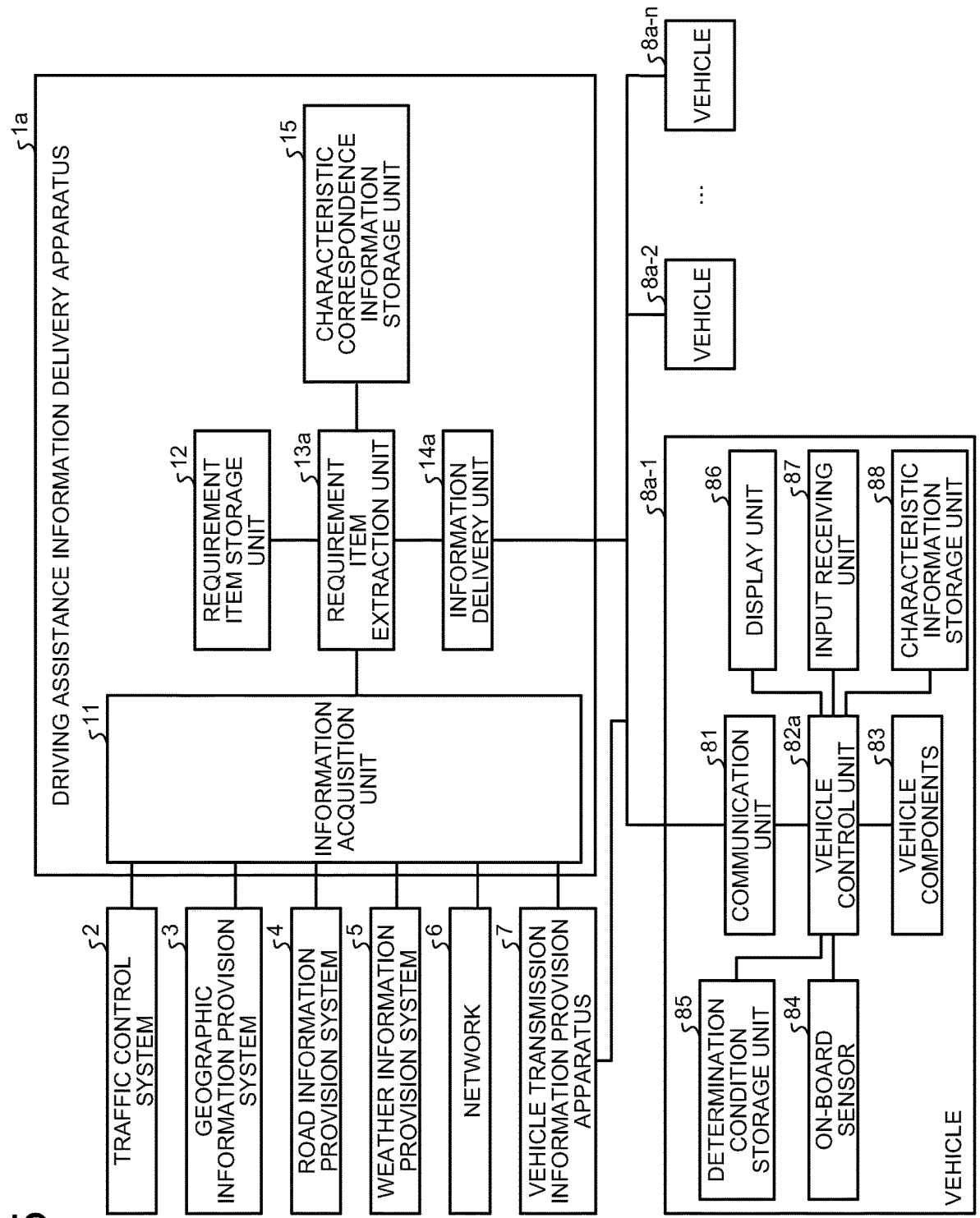
FIG. 15 is a diagram illustrating a configuration example of a traffic system including a driving assistance information delivery apparatus according to a third embodiment.

FIG. 15 is a diagram illustrating a configuration example of a traffic system including a driving assistance information delivery apparatus according to a third embodiment. In the present embodiment, a traffic system includes a driving assistance information delivery apparatus 1a and vehicles 8a-1 to 8a-n. The same reference numerals as those in the first embodiment are assigned to components having the same functions as those of the first embodiment without duplicated explanations. Hereinafter, differences from the first embodiment will be mainly described. Hereinafter, the vehicles 8a-1 to 8a-n are referred to as vehicles 8a when described without individual distinction.

In the present embodiment, the driving assistance information delivery apparatus 1a determines the content of driving assistance information to be transmitted to the vehicles 8a, according to characteristics of the vehicles 8a such as the size and the role. This can prevent delivery of unnecessary information, and thus can reduce radio resources used and can reduce processing load in the vehicles 8a.

The driving assistance information delivery apparatus 1a of the present embodiment is obtained by adding a characteristic correspondence information storage unit 15 to the driving assistance information delivery apparatus 1 of the first embodiment, and includes a requirement item extraction unit 13a and an information delivery unit 14a instead of the requirement item extraction unit 13 and the information delivery unit 14. The characteristic correspondence information storage unit stores characteristic correspondence information indicating correspondences between characteristics of the vehicles 8a and requirement items to be delivered. For each vehicle 8a, the requirement item extraction unit 13a extracts information corresponding to the characteristics of the vehicle 8a using characteristic information on the vehicle 8a, and passes the extracted information to the information delivery unit 14a. The information delivery unit 14a receives the characteristic information from the vehicles 8a. The information delivery unit 14a delivers, to each vehicle 8a, driving assistance information corresponding to the vehicle 8a.

The vehicle 8a-1 is obtained by adding a characteristic information storage unit 88 to the vehicle 8 of the first embodiment, and includes a vehicle control unit 82*a* instead of the vehicle control unit 82. The characteristic information includes at least one of static characteristic information that does not change and dynamic characteristic information that may change depending on driving conditions. The static characteristic information is, for example, at least one of information indicating the vehicle type or the size of the vehicle, and information indicating the role such as for private use, for business use to carry people, or for business use to carry goods. The dynamic characteristic information is, for example, information indicating whether or not the vehicle is equipped with chains or snow tires. For example, the static characteristic information is set by the manufacturer, the seller, the driver, or the like of the vehicle 8*a*-1 before the start of use of the vehicle 8*a*-1, and is stored in the characteristic information storage unit 88. For the dynamic characteristic information, information stored in the characteristic information storage unit 88 may be updated by input from the driver each time a change is made, or the vehicle control unit 82*a* may detect a condition and automatically update information in the characteristic information storage unit 88.

The vehicle control unit 82*a* reads the characteristic information from the characteristic information storage unit 88 and transmits the characteristic information to the driving assistance information delivery apparatus 1*a* via the communication unit 81. Although not illustrated, the vehicles 8*a*-2 to 8*a*-*n* have the same configuration as the vehicle 8*a*-1.

Figure 16:
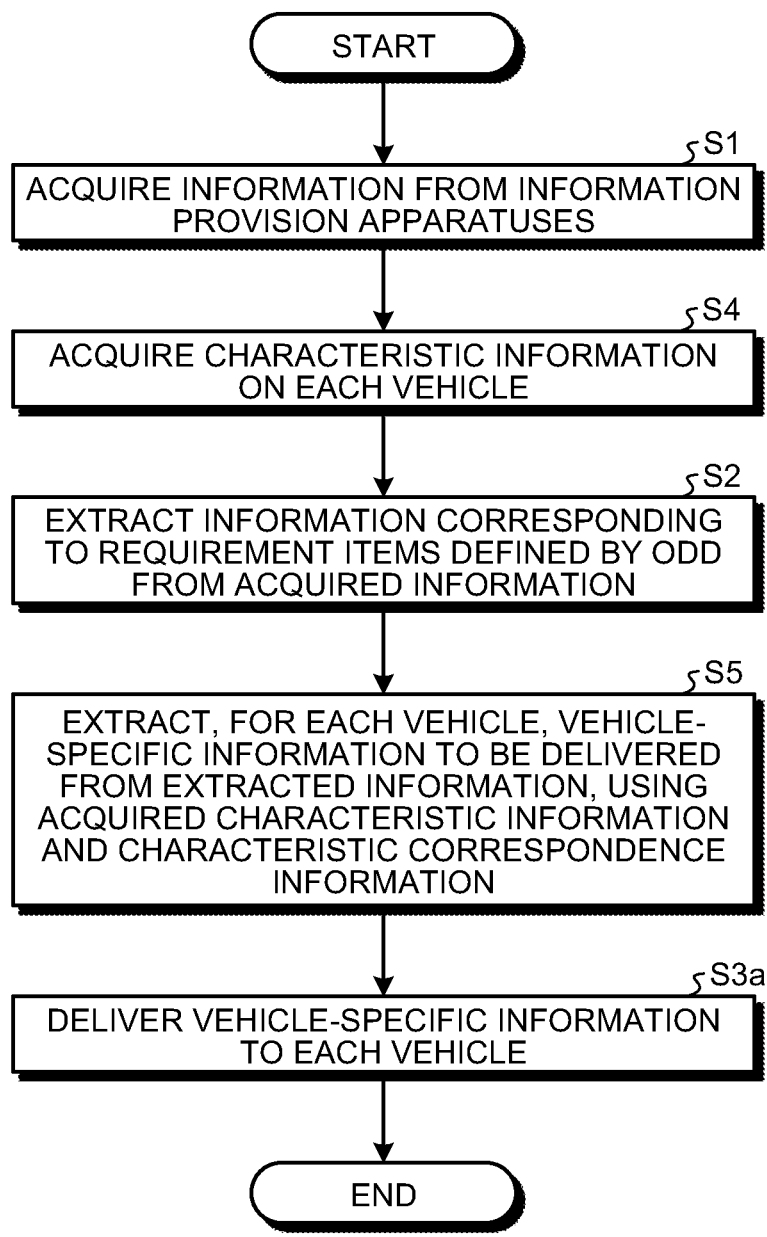
FIG. 16 is a flowchart illustrating an example of a driving assistance information delivery processing procedure in the driving assistance information delivery apparatus of the third embodiment.

FIG. 16 is a flowchart illustrating an example of a driving assistance information delivery processing procedure in the driving assistance information delivery apparatus 1*a* of the present embodiment. Step S1 is the same as that in the first embodiment. After step S1, the driving assistance information delivery apparatus 1*a* acquires the characteristic information on each vehicle 8*a* (step S4). Specifically, the information delivery unit 14*a* receives the characteristic information from the vehicles 8*a* and passes the received characteristic information to the requirement item extraction unit 13*a*.

Step S2 is the same as that in the first embodiment. After step S2, the requirement item extraction unit 13*a* extracts, for each vehicle 8*a*, vehicle-specific information to be delivered from the extracted information, using the acquired characteristic information and the characteristic correspondence information (step S5). Specifically, the requirement item extraction unit 13*a* determines, for each vehicle 8*a*, requirement items corresponding to the characteristics of the vehicle 8*a*, using the acquired characteristic information and the characteristic correspondence information stored in the characteristic correspondence information storage unit 15. Then, the requirement item extraction unit 13*a* extracts, for each vehicle 8*a*, information corresponding to the determined requirement items from the information extracted in step S2, and outputs the extracted information as the vehicle-specific information to the information delivery unit 14*a*. For example, a road width or a road gradient that is not suitable for large vehicles to travel may not be a problem for light vehicles and personal mobility vehicles (PMVs). Thus, when the vehicle type of the vehicle 8*a* is a light vehicle, information indicating the road width and gradient is not important. However, when the vehicle type of the vehicle 8*a* is a large vehicle, information indicating the road width and gradient is important. Therefore, for example, as the characteristic correspondence information, correspondences are stored in which for vehicle types of a large vehicle and an ordinary vehicle, information indicating the road width and gradient is included in the corresponding requirement items, and for vehicle types of a light vehicle and a PMV, information indicating the road width and gradient is not included in the corresponding requirement items. Note that the characteristic correspondence information is not limited to this example.

Next, the information delivery unit 14*a* delivers the vehicle-specific information to each vehicle 8*a* (step S3*a*). The vehicle-specific information is also an example of the driving assistance information. As described above, the requirement item extraction unit 13*a* extracts, for each vehicle 8*a*, information on the items selected according to the characteristic information indicating the characteristics of the vehicle 8*a* as the vehicle-specific information from the information extracted in step S2. The information delivery unit 14*a* delivers, to each vehicle, the corresponding vehicle-specific information as the driving assistance information. The operation of the present embodiment other than that described above is the same as that of the first embodiment.

Like the driving assistance information delivery apparatus 1 of the first embodiment, the driving assistance information delivery apparatus 1*a* of the present embodiment is implemented by the exemplary computer system illustrated in FIG. 12. The characteristic correspondence information storage unit 15 is part of the storage unit 103 illustrated in FIG. 12. The requirement item extraction unit 13*a* is implemented by the control unit 101 executing a driving assistance information delivery program of the present embodiment stored in the storage unit 103. The information delivery unit 14*a* is implemented by the communication unit 105 illustrated in FIG. 12.

The present embodiment may be combined with the second embodiment so that the driving assistance information delivery apparatus 1*a* also generates driving assistance information like that of the first embodiment for transmission to the traffic control system 2*a* of the second embodiment.

As described above, in the present embodiment, the driving assistance information delivery apparatus 1*a* extracts, from information acquired from the information provision apparatuses, information corresponding to the requirement items that is information for determining whether or not the restriction of automated driving or driving assistance functions is necessary, as in the first embodiment. Then, from the extracted information, the driving assistance information delivery apparatus 1*a* extracts information corresponding to the characteristic information of the vehicles 8*a* and transmits the extracted information as the driving assistance information to the vehicles 8*a*. This can provide the same effects as those of the first embodiment, and can reduce radio resources used for the transmission of the driving assistance information.

Fourth Embodiment

Figure 17:
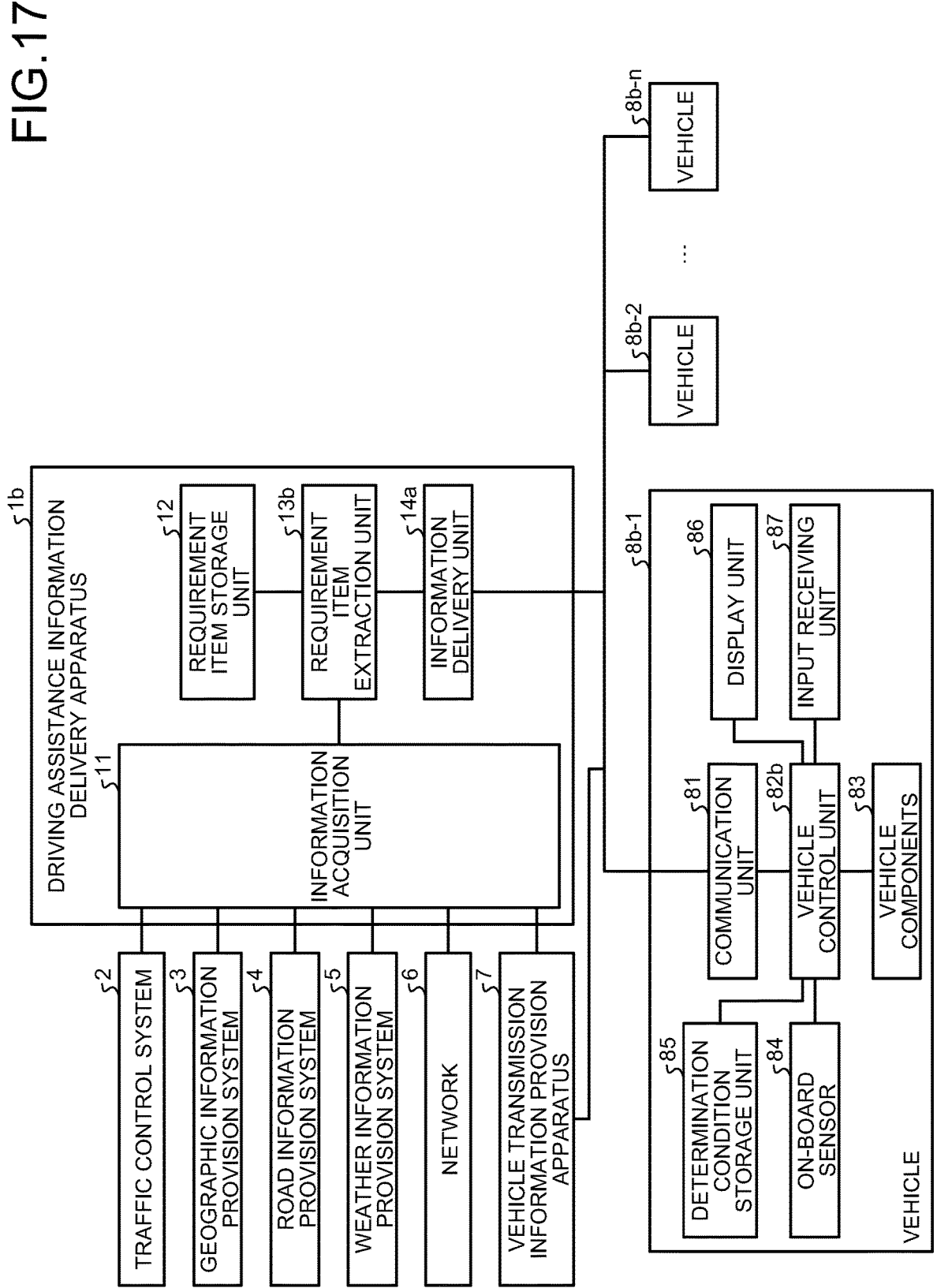
FIG. 17 is a diagram illustrating a configuration example of a traffic system including a driving assistance information delivery apparatus according to a fourth embodiment.

FIG. 17 is a diagram illustrating a configuration example of a traffic system including a driving assistance information delivery apparatus according to a fourth embodiment. In the present embodiment, a traffic system includes a driving assistance information delivery apparatus 1*b* and vehicles 8*b*-1 to 8*b*-*n*. The same reference numerals as those in the first embodiment are assigned to components having the same functions as those of the first embodiment without duplicated explanations. Hereinafter, differences from the first embodiment will be mainly described. Hereinafter, the vehicles 8*b*-1 to 8*b*-*n* are referred to as vehicles 8*b* when described without individual distinction.

In the present embodiment, the driving assistance information delivery apparatus 1*b* determines the content of driving assistance information to be transmitted to the vehicles 8*b* according to routes traveled by the vehicles 8*b*. This can prevent the delivery of unnecessary information, and can reduce radio resources used.

The driving assistance information delivery apparatus 1*b* of the present embodiment includes a requirement item extraction unit 13*b* and the information delivery unit 14*a* instead of the requirement item extraction unit 13 and the information delivery unit 14. The information delivery unit 14*a* is the same as that of the third embodiment in that it receives information from the vehicles 8*b* and delivers driving assistance information to each vehicle 8*b*, and thus is assigned the same reference numeral as that in the third embodiment.

The vehicle 8*b*-1 includes a vehicle control unit 82*b* instead of the vehicle control unit 82. The vehicle control unit 82*b* holds route information indicating a route traveled by the vehicle 8*b*-1, and transmits the route information to the driving assistance information delivery apparatus 1*b* via the communication unit 81.

Figure 18:
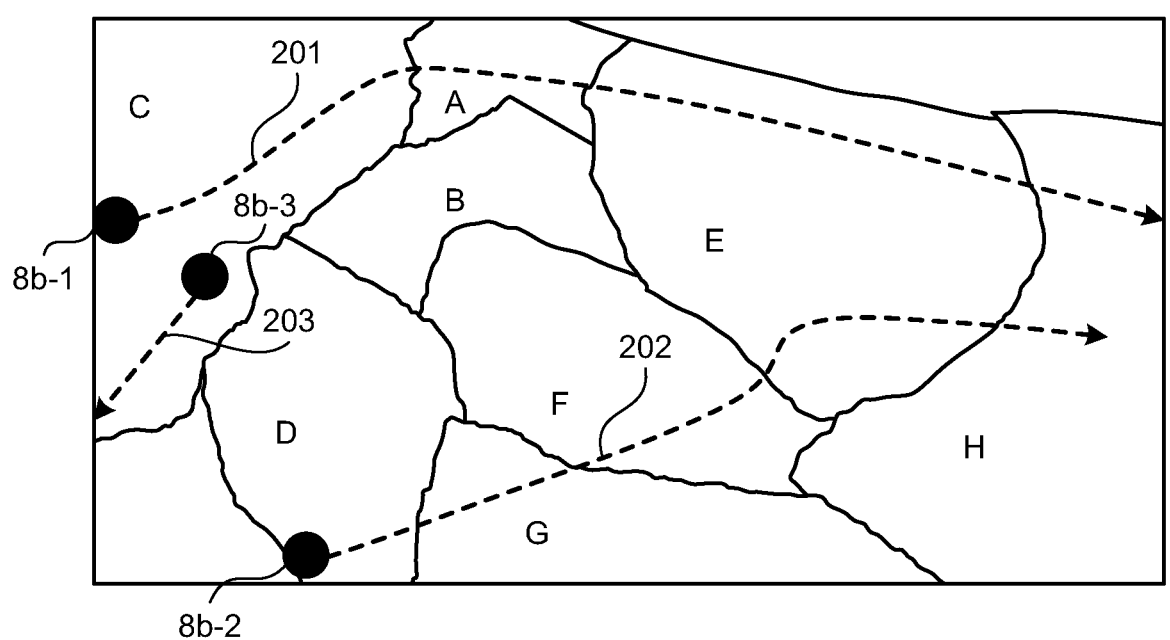
FIG. 18 is a schematic diagram illustrating an example of routes traveled by vehicles of the fourth embodiment.

FIG. 18 is a schematic diagram illustrating an example of routes traveled by the vehicles 8*b* of the present embodiment. In the example illustrated in FIG. 18, the vehicle 8*b*-1 is to travel by a route 201 in the order of the area C, the area A, and the area E, the vehicle 8*b*-2 is to travel by a route 202 in the order of the area D, the area G, the area F, and the area E, and the vehicle 8*b*-3 is to travel by a route 203 from the area C in a direction opposite to the area A. The vehicles 8*b*-1 to 8*b*-3 are located at points indicated by circles in the figure. In this case, information about the area A is necessary for the vehicle 8*b*-1, but is unnecessary for the vehicles 8*b*-2 and 8*b*-3. Thus, in the present embodiment, the driving assistance information delivery apparatus 1*b* extracts information about areas where each vehicle 8*b* is to travel, using the route information on the vehicle 8*b*, and delivers the extracted information to the vehicle 8*b*.

FIG. 19 is a flowchart illustrating an example of a driving assistance information delivery processing procedure in the driving assistance information delivery apparatus 1*b* of the present embodiment. Step S1 is the same as that in the first embodiment. After step S1, the driving assistance information delivery apparatus 1*b* acquires the route information on each vehicle 8*b* (step S6). Specifically, the information delivery unit 14*a* receives the route information from the vehicles 8*a* and passes the received route information to the requirement item extraction unit 13*b*.

Step S2 is the same as that in the first embodiment. After step S2, the requirement item extraction unit 13*b* extracts, for each vehicle 8*b*, vehicle-specific information to be delivered from the extracted information, using the acquired route information (step S7). Specifically, the requirement item extraction unit 13*b* extracts, for each vehicle 8*b*, information about areas where the vehicle 8*b* is to travel from the information extracted in step S2, using the route information on the vehicle 8*b*, and outputs the extracted information as the vehicle-specific information to the information delivery unit 14*a*. The information delivery unit 14*a* delivers the vehicle-specific information to each vehicle 8*b* (step S3*a*). As described above, for each vehicle 8*b*, the requirement item extraction unit 13*b* extracts, as the vehicle-specific information, information on items selected according to the route to be traveled by the vehicle 8*b* from the information extracted in step S2. The information delivery unit 14*a* delivers, to each vehicle 8*b*, the corresponding vehicle-specific information as the driving assistance information.

Like the driving assistance information delivery apparatus 1 of the first embodiment, the driving assistance information delivery apparatus 1*b* of the present embodiment is implemented by the exemplary computer system illustrated in FIG. 12. The requirement item extraction unit 13*b* is implemented by the control unit 101 executing a driving assistance information delivery program of the present embodiment stored in the storage unit 103. As in the third embodiment, the information delivery unit 14*a* is implemented by the communication unit 105 illustrated in FIG. 12.

The present embodiment may be combined with the second embodiment so that the driving assistance information delivery apparatus 1*b* also generates driving assistance information like that in the first embodiment for transmission to the traffic control system 2*a* of the second embodiment. Furthermore, the present embodiment may be combined with the third embodiment so that the driving assistance information delivery apparatus 1*b* extracts information for each vehicle 8*b* based not only on the route information but also on the characteristic information and delivers the extracted information as the vehicle-specific information. Moreover, the present embodiment may be combined with the third embodiment and also combined with the second embodiment so that the driving assistance information delivery apparatus 1*b* also generates driving assistance information like that in the first embodiment for transmission to the traffic control system 2*a* of the second embodiment.

As described above, in the present embodiment, the driving assistance information delivery apparatus 1*b* extracts, from information acquired from the information provision apparatuses, information corresponding to the requirement items that is information for determining whether or not the restriction of automated driving or driving assistance functions is necessary, as in the first embodiment. Then, the driving assistance information delivery apparatus 1*b* extracts information corresponding to the route information on the vehicles 8*b* from the extracted information and transmits the extracted information as the driving assistance information to the vehicles 8*b*. This can provide the same effects as those of the first embodiment, and can reduce radio resources used for the transmission of the driving assistance information.

The configurations described in the above embodiments illustrate an example and can be combined with another known art. The embodiments can be combined with each other. The configurations can be partly omitted or changed without departing from the gist.

REFERENCE SIGNS LIST

1, 1*a*, 1*b* driving assistance information delivery apparatus; 2, 2*a* traffic control system; 3 geographic information provision system; 4 road information provision system; 5 weather information provision system; 6 network; 7 vehicle transmission information provision apparatus; 8-1 to 8-*n*, 8*a*-1 to 8*a*-*n*, 8*b*-1 to 8*b*-*n* vehicle; 11 information acquisition unit; 12 requirement item storage unit; 13, 13*a*, 13*b* requirement item extraction unit; 14, 14*a* information delivery unit; 15 characteristic correspondence information storage unit; 21 driving assistance information receiving unit; 22 requirement storage unit; 23 control information delivery unit; 24, 86 display unit; 25 determination unit; 81 communication unit; 82, 82*a*, 82*b* vehicle control unit; 83 vehicle components; 84 on-board sensor; 85 determination condition storage unit; 87 input receiving unit; 88 characteristic information storage unit; 90 road information board.

The invention claimed is:

1. A driving assistance information delivery apparatus, comprising at least one processor comprising:
   an information acquisition circuitry to acquire information from a plurality of information provision apparatuses;
   a requirement item extraction circuitry to extract information for determining whether or not restriction of automated driving or driving assistance functions is necessary from the information acquired by the information acquisition circuitry; and
   an information delivery circuitry to deliver the information extracted by the requirement item extraction circuitry as driving assistance information,
   wherein, while a vehicle is traveling within a first area toward a second area that shares a boundary with the first area, the at least one processor receives the driving assistance information for the second area, and before the vehicle reaches the boundary between the first area and the second area, and within the first area in which there are no restrictions on the automated driving or driving assistance functions, the at least one processor transmits a notification to the vehicle, that enables the vehicle to display an indication informing that the restriction on the automated driving or driving assistance functions is necessary within the second area, along with a distance from a current location of the vehicle to the second area.

2. The driving assistance information delivery apparatus according to claim 1, wherein the plurality of information provision apparatuses includes at least one of a traffic control system to provide information about traffic, a weather information provision system to provide weather information, a geographic information provision system to provide geographic information, a road information provision system to provide road design information, a system to provide information posted on social media, and an apparatus to provide information acquired from the vehicle.

3. The driving assistance information delivery apparatus according to claim 1, wherein the information delivery circuitry delivers the driving assistance information to the vehicle, and
   before the vehicle reaches the boundary between the first area and the second area, and within the first area, the at least one processor determines that the restriction of the automated driving or driving assistance functions is necessary within the second area, based on a map identifying the boundary between the first area and the second area, and automated driving prohibition legal regulations that differ between the first area and the second area.

4. The driving assistance information delivery apparatus according to claim 3, wherein the driving assistance information includes information for determining whether or not restriction of automated driving or driving assistance functions is necessary in an area adjacent to an area where the driving assistance information is received by the vehicle.

5. The driving assistance information delivery apparatus according to claim 1, wherein the information delivery circuitry delivers the driving assistance information to a traffic control system to deliver control information indicating whether or not restriction of automated driving or driving assistance functions is necessary to a vehicle.

6. The driving assistance information delivery apparatus according to claim 1, wherein
   the requirement item extraction circuitry extracts, for an individual vehicle, information on an item selected according to characteristic information indicating a characteristic of the vehicle as vehicle-specific information from the extracted information, and
   the information delivery circuitry delivers, to each vehicle, the corresponding vehicle-specific information as the driving assistance information,
   wherein the characteristic of the vehicle includes static characteristic information indicating a vehicle type and a vehicle size, and dynamic characteristic information indicating whether the vehicle is equipped with specified equipment.

7. The driving assistance information delivery apparatus according to claim 1, wherein
   the requirement item extraction circuitry extracts, for an individual vehicle, information on an item selected according to a route to be traveled by the vehicle as vehicle-specific information from the extracted information, and
   the information delivery circuitry delivers, to each vehicle, the corresponding vehicle-specific information as the driving assistance information.

8. The driving assistance information delivery apparatus according to claim 1, wherein the requirement item extraction circuitry extracts, from the information acquired by the information acquisition circuitry, information on an item corresponding to at least one of a geographical condition, a road condition, an environmental condition, a traffic condition, and an infrastructure coordination condition as the information for determining whether or not restriction of automated driving or driving assistance functions is necessary.

9. The driving assistance information delivery apparatus according to claim 1, wherein the notification enables the vehicle to display an option to switch to manual driving while the vehicle is within the first area where there are no restrictions on the automated driving or driving assistance functions.

10. A traffic system, comprising:
    a plurality of information provision apparatuses; and
    a driving assistance information delivery apparatus comprising at least one processor:
       an information acquisition circuitry to acquire information from the plurality of information provision apparatuses,
       a requirement item extraction circuitry to extract information for determining whether or not restriction of automated driving or driving assistance functions is necessary from the information acquired by the information acquisition circuitry, and
       an information delivery circuitry to deliver the information extracted by the requirement item extraction circuitry as driving assistance information to a vehicle,
    wherein, while the vehicle is traveling within a first area toward a second area that shares a boundary with the first area, the at least one processor receives the driving assistance information for the second area, and before the vehicle reaches the boundary between the first area and the second area, and within the first area in which there are no restrictions on the automated driving or driving assistance functions, the at least one processor transmits a notification to the vehicle that enables the vehicle to display an indication informing that the restriction on the automated driving or driving assistance functions is necessary within the second area, along with a distance from a current location of the vehicle to the second area.

11. A traffic system, comprising:
a plurality of information provision apparatuses;
a traffic control system; and
a driving assistance information delivery apparatus comprising at least one processor,
the at least one processor comprising:
an information acquisition circuitry to acquire information from the plurality of information provision apparatuses,
a requirement item extraction circuitry to extract information for determining whether or not restriction of automated driving or driving assistance functions is necessary from the information acquired by the information acquisition circuitry, and
an information delivery circuitry to deliver the information extracted by the requirement item extraction circuitry as driving assistance information to the traffic control system, wherein
the traffic control system generates control information indicating whether or not restriction of automated driving or driving assistance functions is necessary, using the driving assistance information received from the driving assistance information delivery apparatus, and
while a vehicle is traveling within a first area toward a second area that shares a boundary with the first area, the at least one processor receives the driving assistance information for the second area, and before the vehicle reaches the boundary between the first area and the second area, and within the first area in which there are no restrictions on the automated driving or driving assistance functions, the at least one processor transmits a notification to the vehicle that enables the vehicle to display an indication informing that the restriction on the automated driving or driving assistance functions is necessary within the second area, along with a distance from a current location of the vehicle to the second area.

12. The traffic system according to claim 11, wherein the traffic control system transmits the generated control information to the vehicle.

13. The traffic system according to claim 11, wherein the traffic control system transmits the generated control information to a road information board installed along a road.

14. A traffic control system comprising at least one processor comprising:
an acquisition circuitry to acquire information for determining whether or not restriction of automated driving or driving assistance functions is necessary;
a determination circuitry to determine whether or not restriction of automated driving or driving assistance functions is necessary, using the information acquired by the acquisition circuitry; and
a control information delivery circuitry to deliver a result of the determination by the determination circuitry as control information to a vehicle,
wherein, while the vehicle is traveling within a first area toward a second area that shares a boundary with the first area, the at least one processor receives the driving assistance information for the second area, and before the vehicle reaches the boundary between the first area and the second area, and within the first area in which there are no restrictions on the automated driving or driving assistance functions, the at least one processor transmits a notification to the vehicle that enables the vehicle to display an indication informing that the restriction on the automated driving or driving assistance functions is necessary within the second area, along with a distance from a current location of the vehicle to the second area.

15. A vehicle, comprising:
a communication circuitry to receive, from a driving assistance information delivery apparatus, information extracted from information acquired from a plurality of information provision apparatuses for determining whether or not restriction of automated driving or driving assistance functions is necessary as driving assistance information;
a determination condition storage circuitry to store determination conditions indicating conditions for determining whether or not restriction of automated driving or driving assistance functions is necessary; and
a vehicle control circuitry to determine whether or not restriction of automated driving or driving assistance functions is necessary, using the driving assistance information received by the communication circuitry and the determination conditions stored in the determination condition storage circuitry,
wherein, while the vehicle is traveling within a first area toward a second area that shares a boundary with the first area, the vehicle control circuitry receives the driving assistance information for the second area, and before the vehicle reaches the boundary between the first area and the second area, and within the first area in which there are no restrictions on the automated driving or driving assistance functions, the vehicle control circuitry transmits a notification to the vehicle that enables the vehicle to display an indication informing that the restriction on the automated driving or driving assistance functions is necessary within the second area, along with a distance from a current location of the vehicle to the second area.

16. The vehicle according to claim 15, further comprising an on-board sensor, wherein
the vehicle control circuitry determines whether or not restriction of automated driving or driving assistance functions is necessary, using the driving assistance information, the determination conditions, and information detected by the on-board sensor.

17. The vehicle according to claim 15, further comprising a display, wherein
the vehicle control circuitry causes the display unit to display content of restriction of automated driving or driving assistance functions.

18. A vehicle controller to receive, via a communication circuitry, driving assistance information extracted from information acquired from a plurality of information provision apparatuses for determining whether or not restriction of automated driving or driving assistance functions is necessary, and
to determine whether or not restriction of automated driving or driving assistance functions is necessary, using the received driving assistance information,
wherein, while the vehicle is traveling within a first area toward a second area that shares a boundary with the first area, the vehicle controller receives the driving assistance information for the second area, and before the vehicle reaches the boundary between the first area and the second area, and within the first area in which there are no restrictions on the automated driving or driving assistance functions, the vehicle controller transmits a notification to the vehicle that enables the vehicle to display an indication informing that the restriction on the automated driving or driving assistance functions is necessary within the second area, along with a distance from a current location of the vehicle to the second area.

19. A non-transitory computer-readable storage medium having a computer program stored therein, the computer program causing a computer to perform:

acquiring information from a plurality of information provision apparatuses;

extracting, from the acquired information, information for determining whether or not restriction of automated driving or driving assistance functions is necessary; and delivering the extracted information as driving assistance information, wherein, the computer program causes the computer to perform while a vehicle is traveling within a first area toward a second area that shares a boundary with the first area, receiving the driving assistance information for the second area, and before the vehicle reaches the boundary between the first area and the second area, and within the first area in which there are no restrictions on the automated driving or driving assistance functions, transmitting a notification to the vehicle that enables the vehicle to display an indication informing that the restriction on the automated driving or driving assistance functions is necessary within the second area, along with a distance from a current location of the vehicle to the second area.

* * * * *